US010261236B2

United States Patent
Namekata et al.

(10) Patent No.: US 10,261,236 B2
(45) Date of Patent: Apr. 16, 2019

(54) AREA LIGHT SOURCE APPARATUS AND LIQUID CRYSTAL DISPLAY DEVICE

(71) Applicant: Japan Display Inc., Minato-ku (JP)

(72) Inventors: Yuki Namekata, Tokyo (JP); Junya Yamamoto, Tokyo (JP)

(73) Assignee: Japan Display Inc., Minato-ku (JP)

( * ) Notice: Subject to any disclaimer, the term of this patent is extended or adjusted under 35 U.S.C. 154(b) by 388 days.

(21) Appl. No.: 14/741,699

(22) Filed: Jun. 17, 2015

(65) Prior Publication Data

US 2016/0004005 A1    Jan. 7, 2016

(30) Foreign Application Priority Data

Jul. 4, 2014  (JP) .................................. 2014-138267
Mar. 27, 2015  (JP) ................................ 2015-065748

(51) Int. Cl.
*G02F 1/1335*  (2006.01)
*F21V 8/00*  (2006.01)

(52) U.S. Cl.
CPC ......... *G02B 6/0073* (2013.01); *G02B 6/0068* (2013.01); *G02F 1/133615* (2013.01); *G02F 2001/133624* (2013.01)

(58) Field of Classification Search
CPC ............... G02F 2001/133624; G02F 1/133615
See application file for complete search history.

(56) References Cited

U.S. PATENT DOCUMENTS

| | | | |
|---|---|---|---|
| 2009/0284682 A1* | 11/2009 | Lee ...................... | G02B 6/0068 349/62 |
| 2010/0007814 A1* | 1/2010 | Kim ..................... | G02B 6/0083 349/58 |
| 2010/0065864 A1 | 3/2010 | Kessels et al. | |

(Continued)

FOREIGN PATENT DOCUMENTS

| | | |
|---|---|---|
| CN | 101206345 A | 6/2008 |
| CN | 101433129 A | 5/2009 |
| CN | 101546797 A | 9/2009 |

(Continued)

OTHER PUBLICATIONS

Office Action dated Jun. 2, 2016 in Korean Patent Application No. 10-2015-0090409 (with English language translation).

(Continued)

*Primary Examiner* — Alexander P Gross
(74) *Attorney, Agent, or Firm* — Oblon, McClelland, Maier & Neustadt, L.L.P.

(57) ABSTRACT

An area light source apparatus includes a first light source and a second light source. Each of the first light source and the second light source is a three-wavelength light-emitting diode. The first light source includes first spectral characteristics including a first peak value at a blue peak wavelength, a second peak value at a green peak wavelength, and a third peak value at a red peak wavelength. The second light source includes second spectral characteristics including a fourth peak value at a blue peak wavelength, a fifth peak value at a green peak wavelength, and a sixth peak value at (Continued)

a red peak wavelength. The second peak value is substantially equal to the fifth peak value, and the third peak value is substantially equal to the sixth peak value.

20 Claims, 18 Drawing Sheets

(56) References Cited

U.S. PATENT DOCUMENTS

| | | | | |
|---|---|---|---|---|
| 2010/0283382 | A1* | 11/2010 | Kwak | C09K 11/025 313/503 |
| 2014/0016349 | A1* | 1/2014 | Minoura | G02B 6/0051 362/607 |

FOREIGN PATENT DOCUMENTS

| | | |
|---|---|---|
| CN | 101581853 A | 11/2009 |
| CN | 101603654 A | 12/2009 |
| CN | 101971082 A | 2/2011 |
| JP | 2006-253502 A | 9/2006 |
| JP | 2009-58650 A | 3/2009 |
| JP | 2013-33252 | 2/2013 |
| KR | 10-0771650 B1 | 10/2007 |
| KR | 10-1121731 B1 | 6/2012 |
| KR | 10-2016-0122376 A | 11/2012 |
| TW | 201320818 A1 | 5/2013 |
| WO | WO 2012/133160 A1 | 10/2012 |

OTHER PUBLICATIONS

Office Action dated Dec. 15, 2016 in Korean Patent Application No. 10-2015-0090409 (with English language translation).

Combined Taiwanese Office Action and Search Report dated Mar. 25, 2016 in Patent Application No. 104121193 (with partial English language translation and English language translation of categories of cited documents).

Office Action dated Dec. 1, 2017, in Chinese Patent Application No. 201510387677.X. with English-language Translation, citing documents AO, AP, AQ, AR, and AS, 109 pages.

Office Action dated May 29, 2018 in corresponding Japanese Patent Application No. 2015-065748 (with English Translation), citing document AO therein, 10 pages.

Combined Office Action and Search Report dated Jul. 10, 2018 in Chinese Patent Application No. 201510387677.X with English translation provided by Global Dossier, citing AO and AP therein, 12 pages.

* cited by examiner

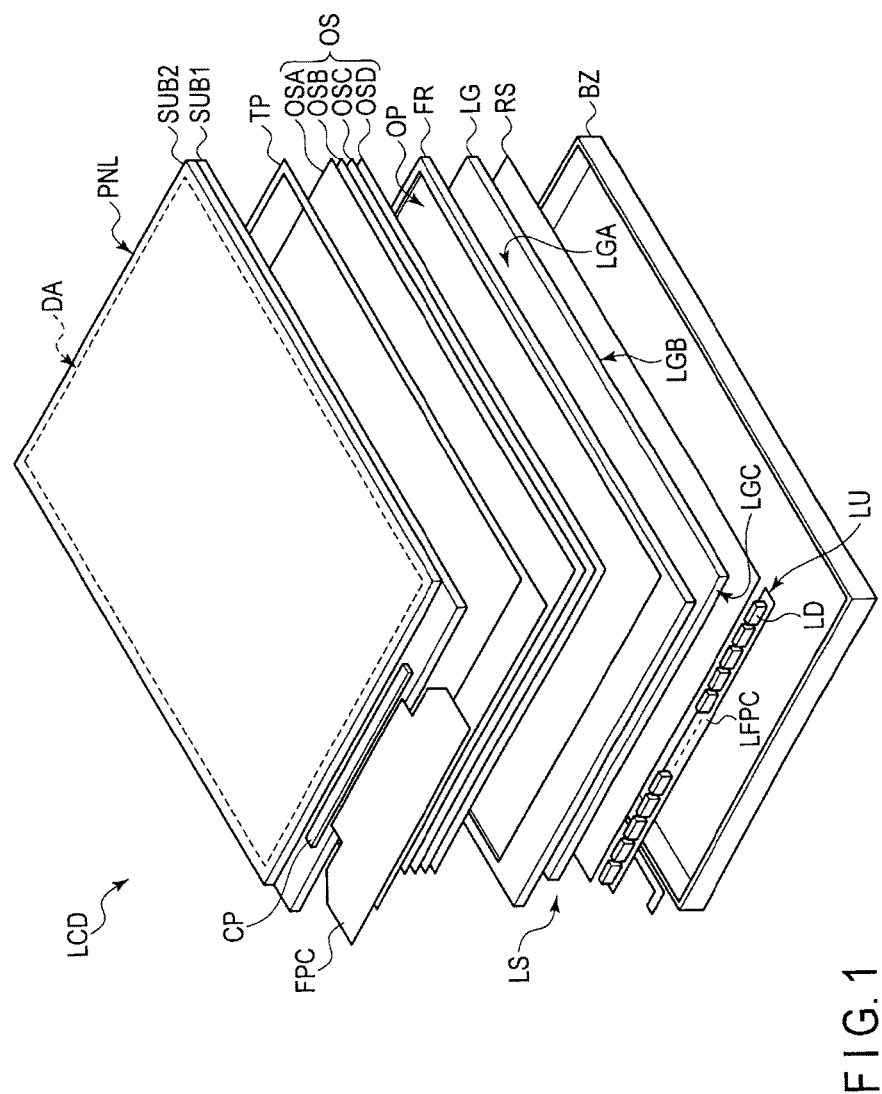
F I G. 1

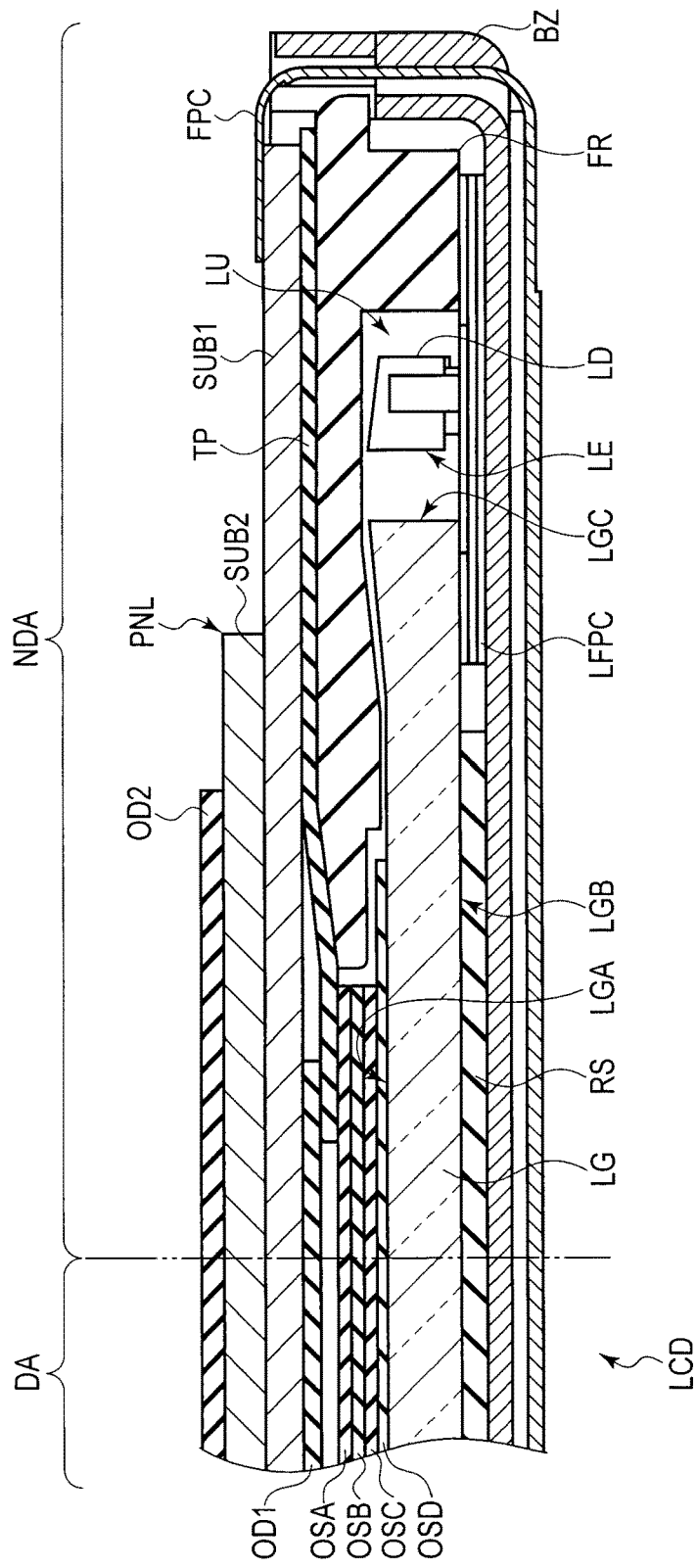
F I G. 2

| LD1 | LD2 | Appearance |
|---|---|---|
| DA0 | DB0 | ○ |
| | DC0, DD0 | × |
| | DB1 | ◎ |
| | DC1, DD1, DE1 | × |
| DB0 | DB1, DC1 | ◎ |
| | DC0 | ○ |
| | DD0 | × |
| | DD1, DE1 | × |
| DC0 | DB1, DC1, DD1 | ◎ |
| | DD0 | ○ |
| | DE1 | × |
| DD0 | DC1, DD1, DE1 | ◎ |
| | DB1 | × |

F I G. 10

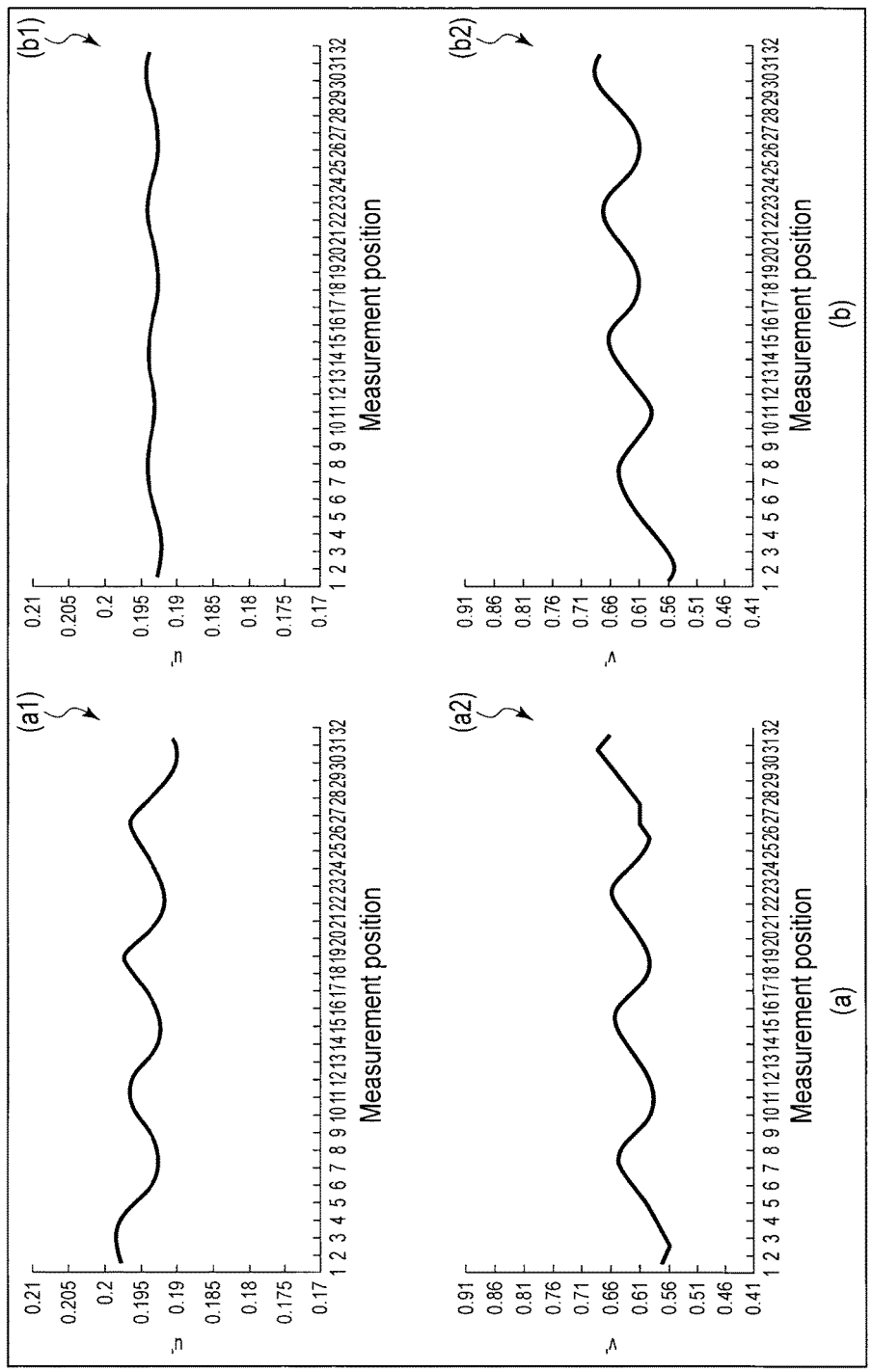
F I G. 11A

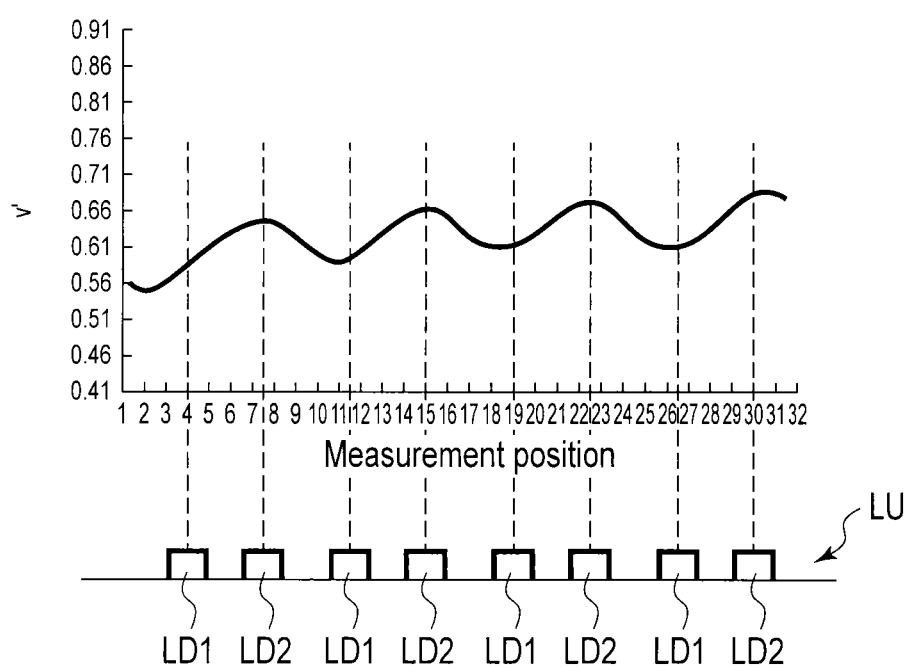
F I G. 11B

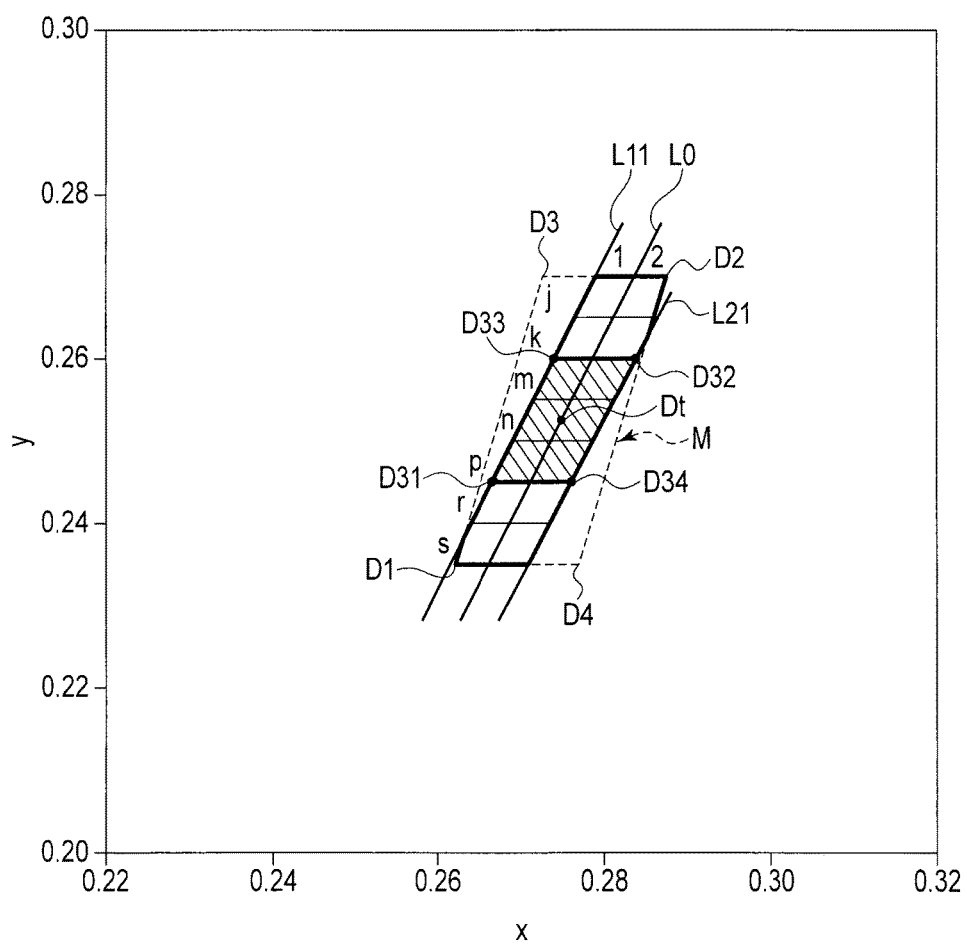
F I G. 12

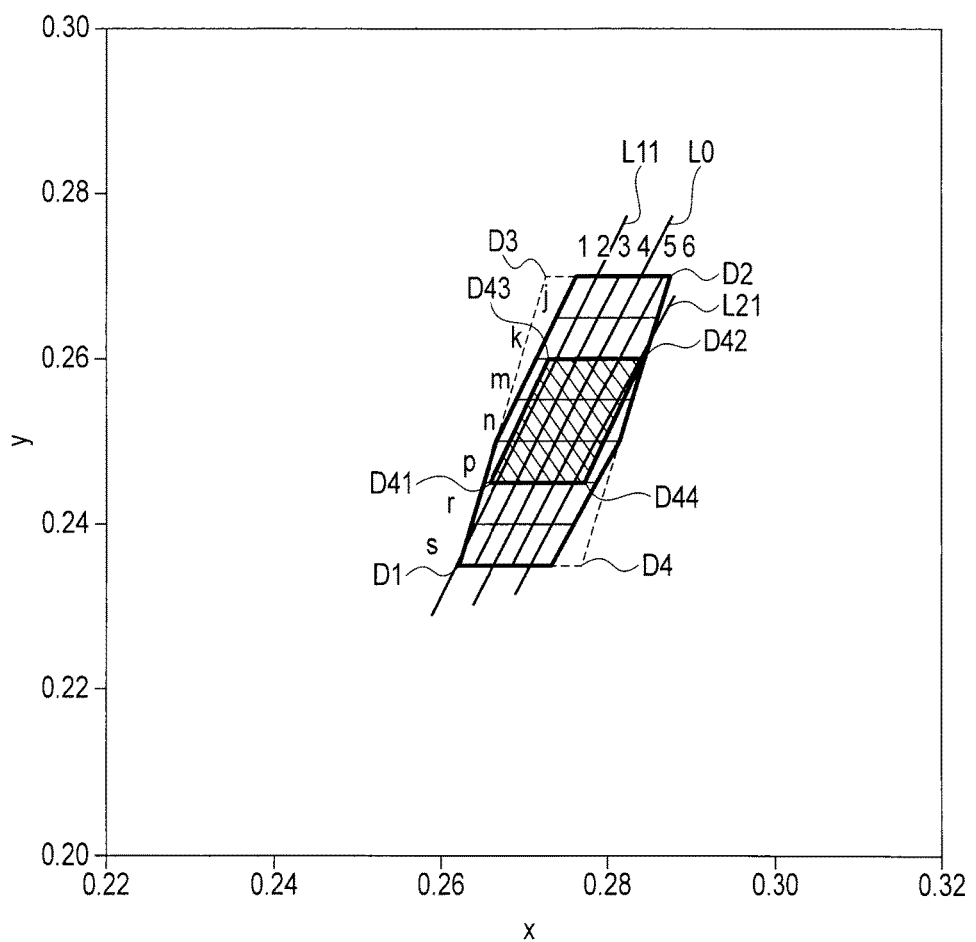
F I G. 13

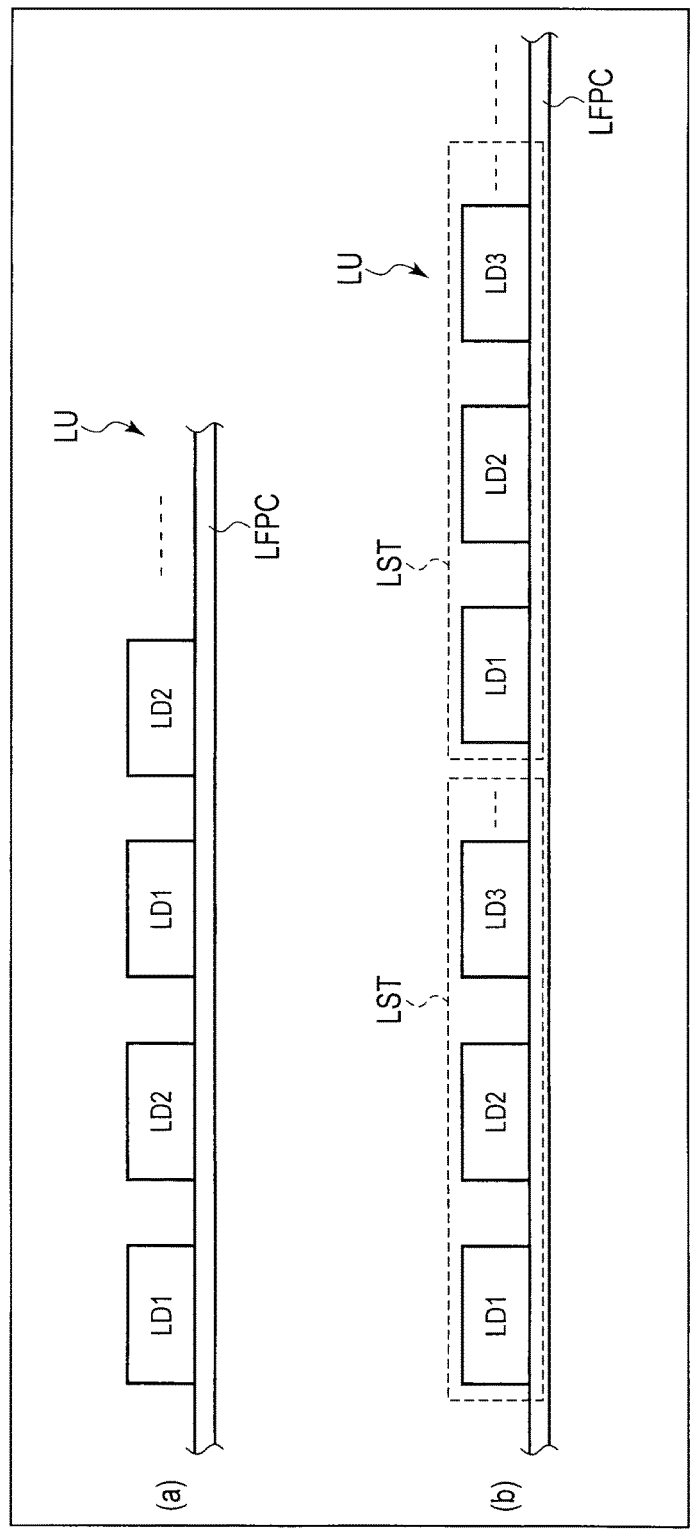
F I G. 14

| Sample No. | Appearance |
|---|---|
| 1 | △ |
| 2 | ○ |
| 3 | × |
| 4 | ◎ |
| 5 | ◎ |
| 6 | × |
| 7 | ○ |
| 8 | △ |
| 9 | ○ |
| 10 | ◎ |
| 11 | ◎ |
| 12 | ◎ |
| 13 | ◎ |
| 14 | ◎ |
| 15 | ○ |
| 16 | ○ |
| 17 | ○ |
| 18 | ○ |
| 19 | ◎ |
| 20 | ◎ |
| 21 | ○ |
| 22 | ◎ |
| 23 | ○ |
| 24 | × |

F I G. 17

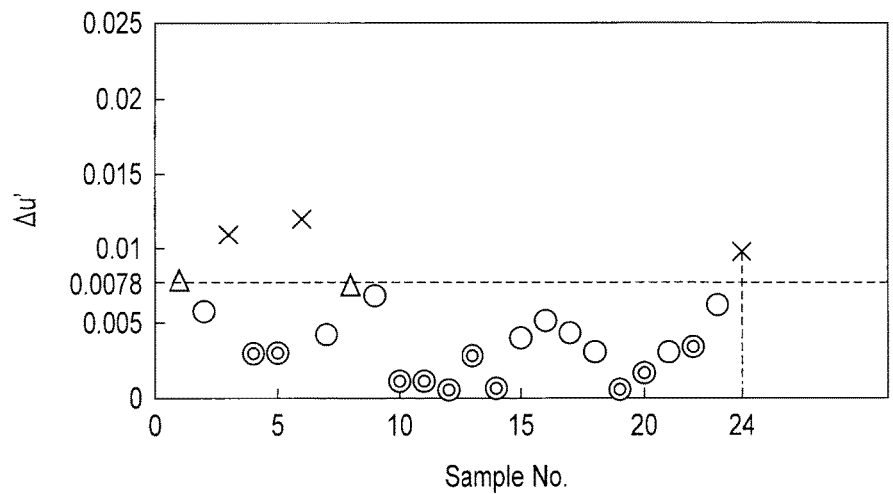
F I G. 18
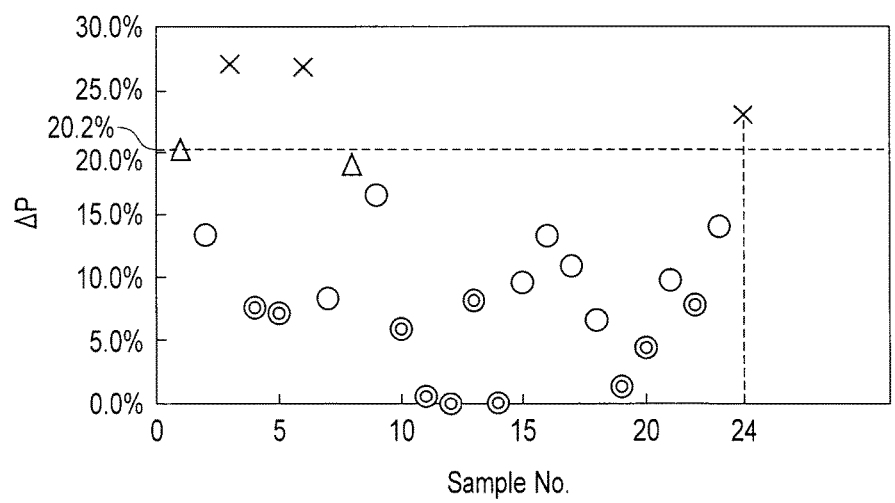
F I G. 19

US 10,261,236 B2

AREA LIGHT SOURCE APPARATUS AND LIQUID CRYSTAL DISPLAY DEVICE

CROSS-REFERENCE TO RELATED APPLICATIONS

This application is based upon and claims the benefit of priority from Japanese Patent Applications No. 2014-138267, filed Jul. 4, 2014; and No. 2015-065748, filed Mar. 27, 2015, the entire contents of all of which are incorporated herein by reference.

FIELD

Embodiments described herein relate generally to an area light source apparatus and a liquid crystal display device.

BACKGROUND

Edge-light area light source apparatuses, which are applied to liquid crystal display devices, provided with white light-emitting diodes as point light sources are practically used. If point light sources are arranged along one side of a light guide, non-uniformity in luminance easily occurs around a light incident surface near the point light sources. To solve such a problem, a technique of, for example, providing the light incident surface with recesses or projections having an anisotropic shape which is long in a direction perpendicular to a light emitting surface is suggested.

BRIEF DESCRIPTION OF THE DRAWINGS

FIG. 1 is an exploded perspective view schematically showing a configuration example of a liquid crystal display device LCD according to the present embodiment.

FIG. 2 is a sectional view schematically showing the configuration example of the liquid crystal display device LCD shown in FIG. 1.

FIG. 10 shows combinations of selected light-emitting diodes LD1 and LD2 and evaluation results of appearance.

FIG. 11A shows measurement results of color chromaticity distribution in a typical area light source apparatus LS.

FIG. 11B illustrates a relationship between the light-emitting diodes LD1 and LD2 and measurement positions.

FIG. 12 is an xy color chromaticity diagram showing an example in which 14 color chromaticity ranks are set in a margin M.

FIG. 13 is an xy color chromaticity diagram showing an example in which 39 color chromaticity ranks are set in the margin M.

FIG. 14 shows an example of a layout of the light-emitting diodes LD in a light source unit LU shown in FIG. 1.

FIG. 17 shows sample numbers of the area light source apparatuses LS and evaluation results of appearance.

FIG. 18 shows a correlation between a color chromaticity difference of the light-emitting diodes LD1 and LD2 in the area light source apparatus LS corresponding to each sample and appearance.

FIG. 19 shows a correlation between a difference of peak values at peak wavelengths of the light-emitting diodes LD1 and LD2 in the area light source apparatus LS corresponding to each sample and appearance.

DETAILED DESCRIPTION

Figure 3A:
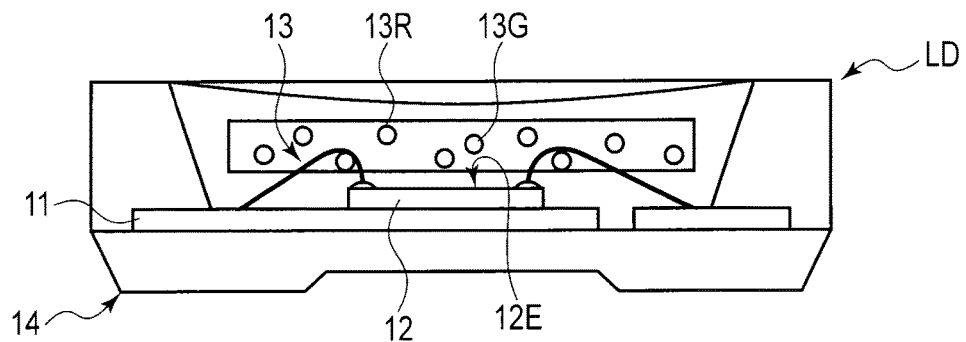
FIG. 3A is a sectional view schematically showing the configuration example of a light-emitting diode LD shown in FIG. 1.

In general, according to one embodiment, an area light source apparatus includes: a first light source and a second light source which are aligned in a single direction; and a light guide including a side surface facing the first light source and the second light source and a principal surface crossing the side surface, wherein each of the first light source and the second light source is a three-wavelength light-emitting diode comprising a blue light-emitting diode chip, a red phosphor and a green phosphor, the first light source includes first spectral characteristics including a first peak value at a blue peak wavelength, a second peak value at a green peak wavelength, and a third peak value at a red peak wavelength, the second light source includes second spectral characteristics including a fourth peak value at a blue peak wavelength, a fifth peak value at a green peak wavelength, and a sixth peak value at a red peak wavelength, and the second peak value and the fifth peak value are substantially equal to each other, and the third peak value and the sixth peak value are substantially equal to each other.

According to another embodiment, a liquid crystal display device includes: a first light source and a second light source which are aligned in a single direction; a light guide including a side surface facing the first light source and the second light source and a principal surface crossing the side surface; and a liquid crystal display panel located on a side facing the principal surface, wherein each of the first light source and the second light source is a three-wavelength light-emitting diode comprising a blue light-emitting diode chip, a red phosphor and a green phosphor, the first light source includes first spectral characteristics including a first peak value at a blue peak wavelength, a second peak value at a green peak wavelength, and a third peak value at a red peak wavelength, the second light source includes second spectral characteristics including a fourth peak value at a blue peak wavelength, a fifth peak value at a green peak wavelength, and a sixth peak value at a red peak wavelength, and the second peak value and the fifth peak value are substantially equal to each other, and the third peak value and the sixth peak value are substantially equal to each other.

Various embodiments will be described hereinafter with reference to the accompanying drawings. It should be noted that disclosure to be made is merely an example, and a change which is to be properly made with the gist of the invention maintained and can be easily conceived by a person with ordinary skill in the art is naturally within the scope of the present invention. Further, the drawings are sometimes schematically shown in terms of a width, thickness, shape, etc., of each module in comparison with an actual form for clarification of description; however, they are just examples and do not limit interpretation of the present invention. Moreover, a structural element fulfilling a function which is the same as or similar to that of the structural element previously described with reference to an already-presented figure will be denoted by the same reference numbers, and their detailed description may be omitted in the specification and each of the drawings.

FIG. 1 is an exploded perspective view schematically showing a configuration example of a liquid crystal display device LCD according to the present embodiment.

The liquid crystal display device LCD comprises an active-matrix liquid crystal display panel PNL, a double-sided tape TP, an optical sheet OS, a frame FR, a light guide LG, a light source unit LU, a reflective sheet RS, a bezel BZ, etc. An area light source apparatus LS which illumines the liquid crystal display panel PNL comprise at least the light guide LG and the light source unit LU.

The liquid crystal display panel PNL comprises a first substrate SUB1 which has a flat shape, a second substrate SUB2 which has a flat shape and is arranged to face the first substrate SUB1, and a liquid crystal layer held between the first substrate SUB1 and the second substrate SUB2. Incidentally, the liquid crystal layer is not shown because it is much thinner than the liquid crystal display panel PNL, and located inside a seal material to be sealed between the first substrate SUB1 and the second substrate SUB2.

The liquid crystal display panel PNL includes a display area DA in which the first substrate SUB1 and the second substrate SUB2 face each other, the display area DA being configured to display an image. In the example shown in the figure, the display area DA is formed to be rectangular. The liquid crystal display panel PNL is of a transmissive type with a transmissive display function of selectively passing through light from the area light source apparatus LS to display an image. Incidentally, the liquid crystal display panel PNL may be of a transflective type with a reflection display function of selectively reflecting outside light to display an image as well as the transmissive display function. Further, as a display mode, the liquid crystal display panel PNL may include a configuration corresponding to a lateral electric field mode in which a lateral electric field substantially parallel to a substrate principal surface is mainly used, and may include a configuration corresponding to a vertical electric field mode in which a vertical electric field substantially perpendicular to a substrate principal surface is mainly used.

In the example shown in the figure, a drive IC chip CP and a flexible printed circuit board FPC are mounted on the first substrate SUB1 as a signal supply source which supplies a signal necessary to drive the liquid crystal display panel PNL.

The optical sheet OS has a light transmission property, is located on the back side of the liquid crystal display panel PNL, and faces at least the display area DA. The optical sheet OS includes a diffusion sheet OSA, a prism sheet OSB, a prism sheet OSC, a diffusion sheet OSD, etc. In the example shown in the figure, any of these optical sheets OS is formed to be rectangular.

The frame FR is located between the liquid crystal display panel PNL and the bezel BZ. In the example shown in the figure, the frame FR is formed in a rectangular frame shape, and includes a rectangular opening portion OP facing the display area DA.

The double-sided tape TP is located between the liquid crystal display panel PNL and the frame FR outside the display area DA. The double-sided tape TP has, for example, a light shielding property, and is formed in a rectangular frame shape.

The light guide LG is located between the frame FR and the bezel BZ. In the example shown in the figure, the light guide LG is formed to be flat, and includes a first principal surface LGA, a second principal surface LGB opposite to the first principal surface LGA, and a side surface LGC connecting the first principal surface LGA and the second principal surface LGB.

The light source unit LU is arranged along the side surface LGC of the light guide LG. The light source unit LU comprises light-emitting diodes LD which function as a light source, a flexible circuit board LFPC on which the light-emitting diodes LD are mounted, etc. The light-emitting diodes LD are aligned in a single direction. In the example shown in the figure, these light-emitting diodes LD are aligned in a line along the side surface LGC which is parallel to the short side of the light guide LG. Incidentally, the light-emitting diodes LD may be aligned along another side surface which is parallel to the long side of the light guide LG (side surface crossing the side surface LGC). For example, the light source unit LU comprises an even number of light-emitting diodes LD. The light-emitting diodes LD will be described in detail later.

The reflective sheet RS has light reflectivity, and is located between the bezel BZ and the light guide LG. In the example shown in the figure, the reflective sheet RS is formed to be rectangular.

The bezel BZ accommodates the liquid crystal display panel PNL, the double-sided tape TP, the optical sheet OS, the frame FR, the light guide LG, the light source unit LU, and the reflective sheet RS, which are described above. In the example shown in the figure, the area light source apparatus LS is arranged on the back side of the liquid crystal display panel PNL, that is, on a side facing the first substrate SUB1. The area light source apparatus LS functions as a backlight.

FIG. 2 is a sectional view schematically showing a configuration example of the liquid crystal display device LCD shown in FIG. 1.

The liquid crystal display panel PNL, various optical sheets OSA to OSD, the light guide LG, and the reflective sheet RS extend not only in the display area DA but also in a non-display area NDA outside the display area DA. The light source unit LU and the frame FR are located in the non-display area NDA.

The reflective sheet RS faces the second principal surface LGB of the light guide LG. Each of various optical sheets OSA to OSD is laminated between the first principal surface LGA of the light guide LG and the liquid crystal display panel PNL.

In the light source unit LU, the flexible circuit board LFPC is located between the bezel BZ, and the light guide LG and frame FR. The flexible circuit board LFPC adheres to the second principal surface LGB of the light guide LG by, for example, double-sided tape. The light-emitting diode LD is accommodated in a space between the frame FR and the bezel BZ. A light-emitting surface LE of the light-emitting diode LD faces the side surface LGC of the light guide LG. The side surface LGC corresponds to an incidence surface on which light radiated from the light-emitting diode LD is incident. Further, the first principal surface LGA crossing the side surface LGC corresponds to an emission surface on which light incident from the side surface LGC is emitted. The liquid crystal display panel PNL is located on a side facing the first principal surface LGA.

The double-sided tape TP is caused to adhere to the liquid crystal display panel PNL and the frame FR in the non-display area NDA. The liquid crystal display panel PNL comprises a first optical device OD1 attached to an outer surface of the first substrate SUB1, and a second optical device OD2 attached to an outer surface of the second substrate SUB2. Each of the first optical device OD1 and the second optical device OD2 includes at least a polarizer. The first optical device OD1 faces an optical sheet (diffusion sheet) ODA.

FIG. 3A is a sectional view schematically showing a configuration example of the light-emitting diode LD shown in FIG. 1.

The light-emitting diode LD applied in the present embodiment is constituted by combining a blue light-emitting diode chip which emits blue light (hereinafter a blue LED chip), a red phosphor, and a green phosphor. Such a light-emitting diode LD is called, for example, a single-chip three-wavelength light-emitting diode.

That is, the light-emitting diode LD comprises a frame 11, a blue LED chip 12, a resin layer 13, a package 14, etc. The frame 11 is made of metal such as copper, and supports the blue LED chip 12. The blue LED chip 12 is mounted on the frame 11. The blue LED chip 12 radiates blue light including a peak of spectral intensity, for example, at a blue wavelength of 440 nm to 460 nm. The resin layer 13 is located on a side facing a light-emitting surface 12E of the blue LED chip 12. The resin layer 13 includes at least a red phosphor 13R and a green phosphor 13G. Incidentally, the resin layer 13 may include a phosphor in a color different from red and green as necessary, for example, a yellow phosphor. The package 14 accommodates the frame 11, the blue LED chip 12, and the resin layer 13.

The light-emitting diode LD functions as a white light source which radiates white light by combining blue light from the blue LED chip 12, red fluorescence from the red phosphor 13R, and green fluorescence from the green phosphor 13G. The spectral characteristics of this light-emitting diode LD include a peak at each of a blue wavelength, a green wavelength, and a red wavelength. The peak at the blue wavelength mainly depends on blue light radiated from the blue LED chip 12. The peak at the green wavelength mainly depends on fluorescence from the green phosphor 13G. The peak at the red wavelength mainly depends on fluorescence from the red phosphor 13R.

Figure 3B:
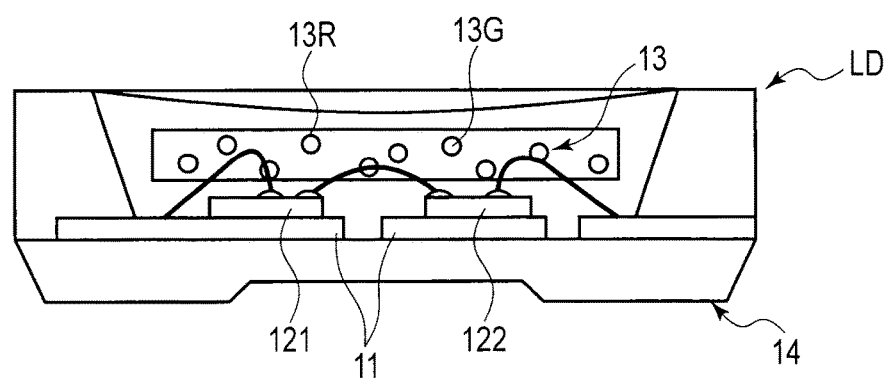
FIG. 3B is a sectional view schematically showing another configuration example of the light-emitting diode LD shown in FIG. 1.

FIG. 3B is a sectional view schematically showing another configuration example of the light-emitting diode LD shown in FIG. 1. The configuration example shown in the figure is different from that shown in FIG. 3A in that one light-emitting diode LD comprises two blue LED chips 121 and 122. The blue LED chips 121 and 122 face the resin layer 13 including the red phosphor 13R and the green phosphor 13G, and are accommodated in the package 14 along with the frame 11.

Such a light-emitting diode LD includes an advantage that the color reproduction on a color chromaticity diagram can be expanded in comparison with a white light-emitting diode using a YAG or a yellow phosphor such as silicate-based phosphor (comparative example). On the other hand, since the light-emitting diode LD uses two types of phosphor, a color chromaticity tends to vary more widely than the white light-emitting diode according to the comparative example in manufacturing. Further, since the light-emitting diode LD includes spectral characteristics with a peak at each of the three wavelengths of the blue wavelength, green wavelength, and red wavelength, a color chromaticity of radiated white light tends to vary widely due to variations of a spectrum, for example, variations of a peak value at each of the blue wavelength, green wavelength, and red wavelength. Thus, a color chromaticity unique to each of mass-produced light-emitting diodes LD is distributed comparatively widely on a color chromaticity diagram.

To apply such light-emitting diodes LD to the light source unit LU, a mounting method of categorizing the light-emitting diodes into corresponding color chromaticity ranks in advance in accordance with their color chromaticity, and regularly arranging the light-emitting diodes LD in different color chromaticity ranks is suggested (mixing). According such a mounting method, individual light radiated from the light-emitting diodes LD in different color chromaticity ranks is mixed inside the light guide LG, and is emitted from the light guide LG.

Incidentally, when the light-emitting diodes LD are mixed, the individual radiated light may not be sufficiently mixed depending on the combination of the light-emitting diodes LD in the different color chromaticity ranks. In particular, an individual color of light radiated from the light-emitting diodes LD remains as it is near the side surface (incidence surface) LGC of the light guide LG, and uniformity of the color chromaticity on the surface may be impaired as the area light source apparatus LS. Further, display quality may be deteriorated in a liquid crystal display device in which such an area light source apparatus LS is applied.

Mixing of the light-emitting diodes LD in the present embodiment will be hereinafter described.

Figure 4:
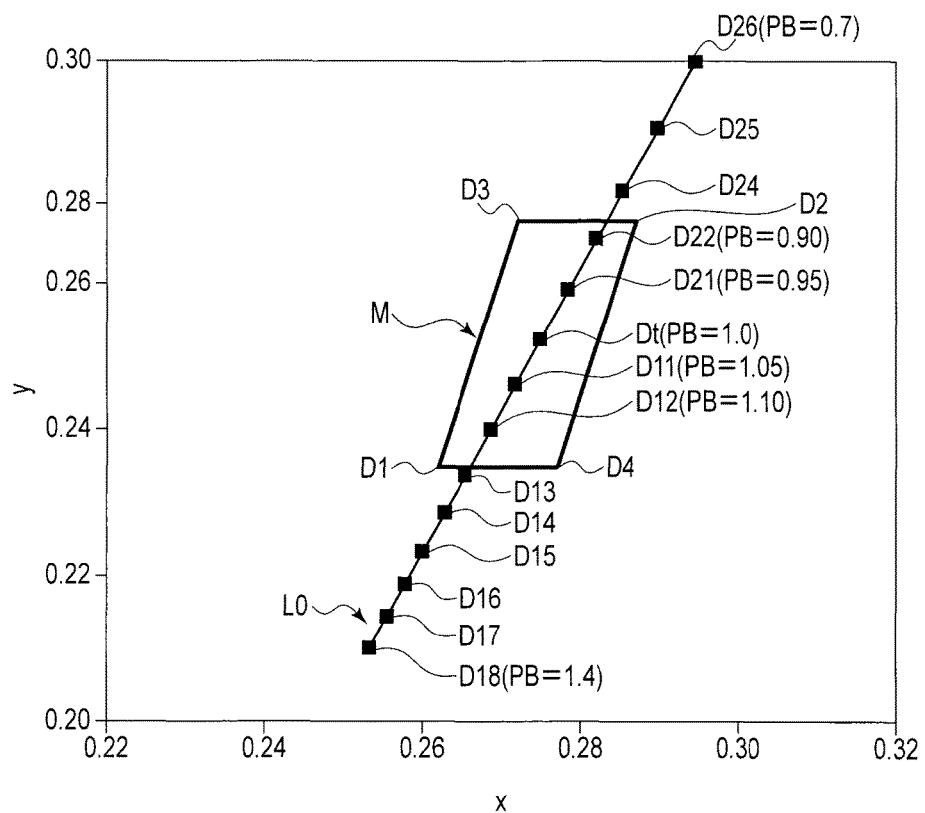
FIG. 4 is an xy color chromaticity diagram showing a margin M of a color chromaticity of light (white light) radiated from light-emitting diodes LD with a specification.

FIG. 4 is an xy color chromaticity diagram showing a margin M of a color chromaticity of light (white light) radiated from the light-emitting diodes LD with a specification. The xy color chromaticity diagram described herein refers to a diagram indicating color chromaticity coordinates (x, y) on a plane in a 2° visual field XYZ color system, and is sometimes called a CIE1931 color chromaticity diagram.

The light-emitting diodes LD with a specification are manufactured to obtain radiated light (white light) of target color chromaticity coordinates by combining a blue LED chip with a peak of spectral intensity at the same wavelength, a red phosphor and a green phosphor. Color chromaticities of the light radiated from the light-emitting diodes LD manufactured in this manner are distributed in a predetermined range on the color chromaticity diagram in each of the light-emitting diodes LD, depending on variations of the peak value at each of the blue wavelength, green wavelength, and red wavelength of each light-emitting diode LD. For example, the light-emitting diodes LD with a specification are manufactured such that radiated light based on target color chromaticity coordinates indicated by a dot Dt shown in the figure is obtained. In this case, the margin (variations) M of the color chromaticity of the light-emitting diodes LD with the specification covers a range from coordinates D1 to coordinates D2. In the example shown in the figure, the margin M covers a range indicated by the quadrangle specified by the coordinates D1 to D4 in the figure. Incidentally, the shape of the margin M is not limited to the example shown in the figure.

For example, the target color chromaticity coordinates indicated by the dot Dt are (x, y)=(0.2748, 0.2525), the coordinates D1 are (x, y)=(0.2620, 0.2350), the coordinates D2 are (x, y)=(0.2875, 0.2700), the coordinates D3 are (x, y)=(0.2788, 0.2700), and the coordinates D4 are (x, y)=(0.2704, 0.2350). The dot Dt of the target color chromaticity coordinates is located in the middle of the coordinates D1 and the coordinates D2, or at the center of the margin M (barycentric coordinates of the quadrangle shown in the figure).

A line L0 in the figure corresponds to a set of individual color chromaticities of the light-emitting diodes LD with spectral characteristics in which the ratio of the peak value at the green wavelength to that at the red wavelength is constant, and the peak value at the blue wavelength is different, of the light-emitting diodes LD with a specification. Incidentally, the line L0 is not necessarily straight. The dots D11 to D18 and D21 to D26 on the line L0 represent color chromaticities of typical light-emitting diodes LD. Incidentally, the dot Dt of the target color chromaticity coordinates is located on the line L0. The line L0 crosses the margin M. Any of the dot Dt, D11, D12, D21 and D22 on the line L0 is located inside the margin M.

Figure 5:
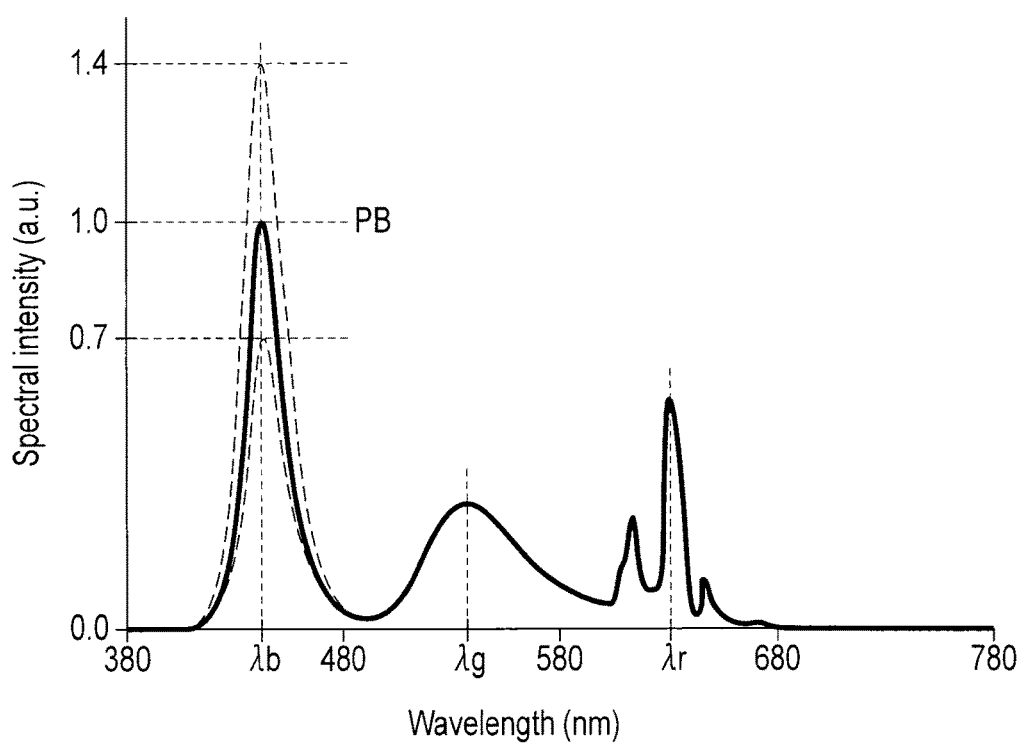
FIG. 5 shows an example of spectral characteristics of a light-emitting diode LD with a color chromaticity on a line L0 shown in FIG. 4.

FIG. 5 shows an example of spectral characteristics of the light-emitting diode LD with a color chromaticity on the line L0 shown in FIG. 4. In the present embodiment, the spectral characteristics of the light-emitting diode LD are measured by a spectroradiometer, CS2000 (made by Konica Minolta).

The horizontal axis in the figure represents a wavelength (nm), and the vertical axis represents spectral intensity (a.u.). The spectral characteristics of the light-emitting diode LD include a peak at the blue wavelength of approximately 450 nm (for example, approximately 445 nm), a peak at the green wavelength of approximately 540 nm (for example, 538 nm), and a peak at the red wavelength of approximately 630 nm (for example, 631 nm). Although the spectral characteristics of the example shown in the figure include three peaks at the red wavelength, the highest peak of the spectral intensity is set as the peak at the red wavelength. Further, if a plurality of peaks appears also in other wavelength such as a blue wavelength, the highest peak of the spectral intensity is set as the peak at the other wavelength. The spectral intensity at each peak corresponds to a peak value. In the following description, a wavelength at which a peak of spectral intensity can be obtained with respect to spectral characteristics measured by the spectroradiometer is sometimes called a peak wavelength. In the figure, $\lambda b$ indicates the blue peak wavelength (approximately 445 nm), $\lambda g$ indicates the green peak wavelength (approximately 538 nm), and $\lambda r$ indicates the red peak wavelength (approximately 631 nm).

Further, the wavelength in the horizontal axis shown in the figure can also be converted into a dominant wavelength obtained by digitizing a wavelength of a color of light sensed by the human eye. That is, the spectral characteristics based on the dominant wavelength represented in the horizontal axis are obtained by multiplying spectral intensity at each wavelength shown in the figure by luminosity factor.

A peak value PB at a blue peak wavelength $\lambda b$ is set 1 in the spectral characteristics of the light-emitting diodes LD in which the target color chromaticity coordinates indicated by the dot Dt are obtained. The peak value at the green peak wavelength $\lambda g$ and the peak value at the red peak wavelength $\lambda r$ are constant. Each of the light-emitting diodes LD obtained by changing only the peak value PB of the blue peak wavelength $\lambda b$ by 0.05 from 1 to 1.4 includes color chromaticities indicated by the dots D11 to D18 shown in FIG. 4. Each of the light-emitting diodes LD obtained by changing only the peak value PB of the blue peak wavelength $\lambda b$ by 0.05 from 1 to 0.7 includes color chromaticities indicated by the dots D21 to D26 shown in FIG. 4. Typically, the dot D11 corresponds to the case where the peak value PB is 1.05, the dot D12 corresponds to the case where the peak value PB is 1.10, and the dot D13 corresponds to the case where the peak value PB is 1.15. Further, the dot D21 corresponds to the case where the peak value PB is 0.95, the dot D22 corresponds to the case where the peak value PB is 0.90, and the dot D23 corresponds to the case where the peak value PB is 0.85.

Figure 6:
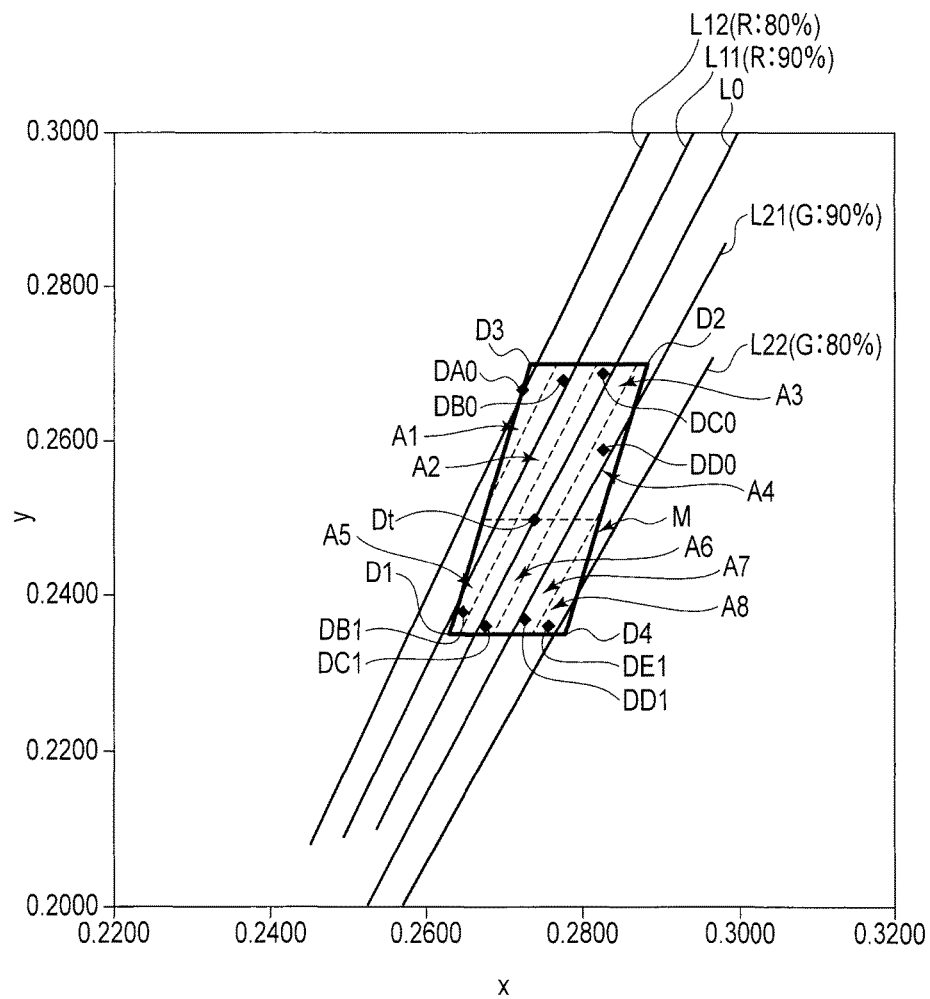
FIG. 6 is an xy color chromaticity diagram showing a relationship between an acceptable range of peak values of red and green peak wavelengths and the margin M regarding the light (white light) radiated from the light-emitting diodes LD with the same specification as that shown in FIG. 4.

FIG. 6 is an xy color chromaticity diagram showing a relationship between an acceptable range of peak values of red and green peak wavelengths and the margin M regarding the light (white light) radiated from the light-emitting diodes LD with the same specification as that shown in FIG. 4.

Here, the light-emitting diodes LD with the same specification are categorized into five on the basis of spectral characteristics of each light-emitting diode LD. The lines L0, L11, L12, L21 and L22 shown in the figure correspond to a set of individual color chromaticities of the categorized light-emitting diodes LD, and any of them crosses the margin M. Incidentally, in the present embodiment, all the lines L0, L11, L12, L21 and L22 to be described later are not necessarily straight.

The relationship between the margin M and the lines L0, L11, L12, L21 and L22 are considered. The line L0 passes between the coordinates D1 and the coordinates D4, and between the coordinates D2 and the coordinates D3, and crosses the center of the margin M. Each of the lines L11 and L12 passes between the coordinates D1 and the coordinates D3, and between the coordinates D2 and the coordinates D3. The line L12 crosses the margin M near the coordinates D3, and the line L11 is located substantially in the middle of the lines L0 and L12. Each of the lines L21 and L22 passes between the coordinates D1 and the coordinates D4, and between the coordinates D2 and the coordinates D4. The line L22 crosses the margin M near the coordinates D4, and the line L21 is located substantially in the middle of the lines L0 and L22.

The spectral characteristics of the light-emitting diodes LD corresponding to the line L0 correspond to a set of individual color chromaticities of the light-emitting diodes LD obtained by changing only the peak value at the blue peak wavelength by 0.05 from 0.7 to 1.4 with the ratio of the peak value at the green peak wavelength to that at the red peak wavelength fixed, as shown in FIG. 5. In this regard, the spectral characteristics in which the peak value at the blue peak wavelength is 1 are set as reference spectral characteristics.

In the spectral characteristics of the light-emitting diodes LD corresponding to each of the lines L11 and L12, the peak value at the red peak wavelength is less than that at the red peak wavelength of the reference spectral characteristics when the peak value at the green peak wavelength is normalized to be 1. More specifically, the spectral characteristics corresponding to L11 include a peak value corresponding to 90% of the peak value of the reference spectral characteristics at its red peak wavelength. Further, the spectral characteristics corresponding to L12 include a peak value corresponding to 80% of the peak value of the reference spectral characteristics at its red peak wavelength.

That is, the spectral characteristics of the light-emitting diodes LD corresponding to the line L11 correspond to a set of individual color chromaticities of the light-emitting diodes LD obtained by changing only the peak value at the blue peak wavelength by 0.05 from 0.7 to 1.4 in the same manner as the case of the line L0, while the peak value at the green peak wavelength is the same as that at the green peak wavelength of the reference spectral characteristics, and the peak value at the red peak wavelength corresponds to 90% of the peak value at the red peak wavelength of the reference spectral characteristics. Similarly, the spectral characteristics of the light-emitting diodes LD corresponding to the line L12 correspond to a set of individual color chromaticities of the light-emitting diodes LD obtained by changing only the peak value at the blue peak wavelength by 0.05 from 0.7 to 1.4 in the same manner as the line L0, while the peak value at the green peak wavelength is the same as that at the green peak wavelength of the reference spectral characteristics, and the peak value at the red peak wavelength corresponds to 80% of the peak value at the red peak wavelength of the reference spectral characteristics.

In the spectral characteristics of the light-emitting diodes LD corresponding to each of the lines L21 and L22, the peak value at the green peak wavelength is less than that at the green peak wavelength of the reference spectral characteristics when the peak value at the red peak wavelength is normalized to be 1. More specifically, the spectral characteristics corresponding to L21 include a peak value corresponding to 90% of the peak value of the reference spectral characteristics at its green peak wavelength. Further, the spectral characteristics corresponding to L22 include a peak value corresponding to 80% of the peak value of the reference spectral characteristics at its green peak wavelength.

That is, the spectral characteristics of the light-emitting diodes LD corresponding to the line L21 correspond to a set of individual color chromaticities of the light-emitting diodes LD obtained by changing only the peak value at the blue peak wavelength by 0.05 from 0.7 to 1.4 in the same manner as the case of the line L0, while the peak value at the red peak wavelength is the same as that at the red peak wavelength of the reference spectral characteristics, and the peak value at the green peak wavelength corresponds to 90% of the peak value at the green peak wavelength of the reference spectral characteristics. Similarly, the spectral characteristics of the light-emitting diodes LD corresponding to the line L22 correspond to a set of individual color chromaticities of the light-emitting diodes LD obtained by changing only the peak value at the blue peak wavelength by 0.05 from 0.7 to 1.4 in the same manner as the line L0, while the peak value at the red peak wavelength is the same as that at the red peak wavelength of the reference spectral characteristics, and the peak value at the green peak wavelength corresponds to 80% of the peak value at the green peak wavelength of the reference spectral characteristics.

Any of eight dots DA0, DB0, DB1, DC0, DC1, DD0, DD1 and DE1 shown in the figure is located inside the margin M and near the end of the margin M. The dot DA0 is located on or near the line L12. The dots DB0 and DB1 are located on or near the line L11. The dots DC0 and DC1 are located on or near the line L0. The dots DD0 and DD1 are located on or near the line L21. The dot DE1 is located on or near the line L22.

Figure 7:
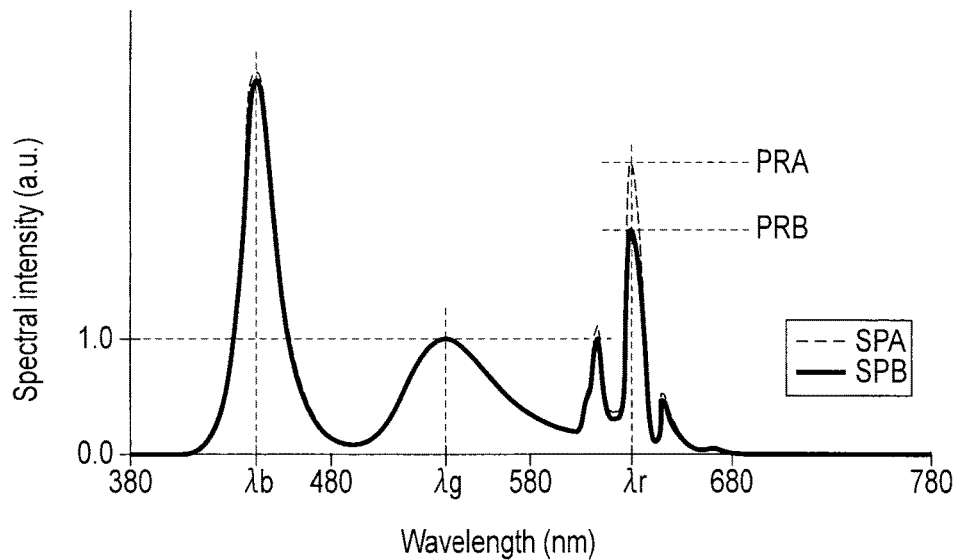
FIG. 7 shows an example of spectral characteristics of the light-emitting diode LD with a color chromaticity on a line L11 or L12 shown in FIG. 6.
Figure 8:
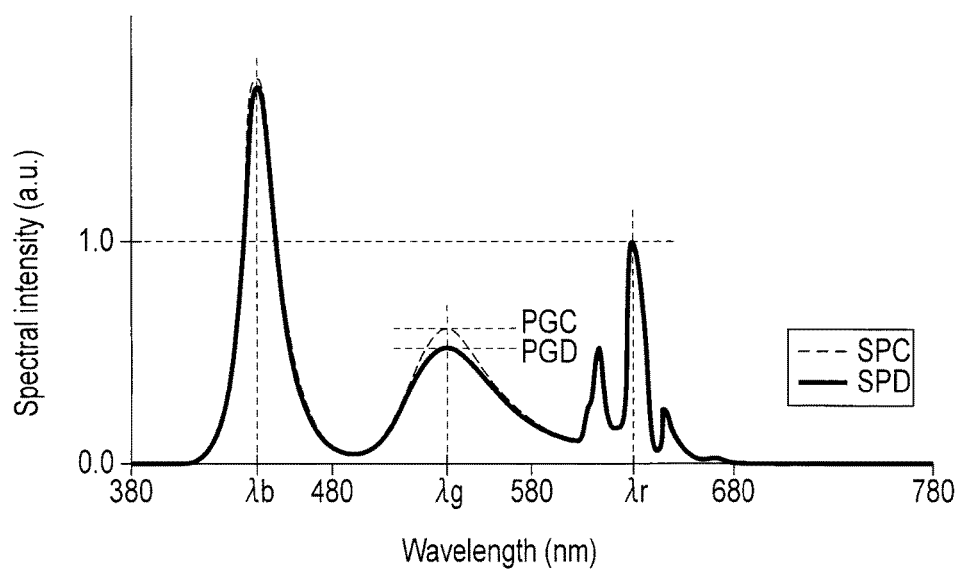
FIG. 8 shows an example of spectral characteristics of the light-emitting diode LD with a color chromaticity on a line L21 or L22 shown in FIG. 6.

FIG. 7 shows an example of spectral characteristics of the light-emitting diode LD with a color chromaticity on the line L11 or L12 shown in FIG. 6. FIG. 8 shows an example of spectral characteristics of the light-emitting diode LD with a color chromaticity on the line L21 or L22 shown in FIG. 6. Incidentally, the horizontal axes in FIG. 7 and FIG. 8 represent a wavelength (nm), and the vertical axes represent spectral intensity (a.u.).

In the example shown in FIG. 7, the peak value at the green peak wavelength $\lambda g$ of approximately 538 nm is normalized to be 1 regarding two types of spectral characteristics of the light-emitting diodes LD, that is, spectral characteristics SPA and SPB. The spectral characteristics SPA include a peak value PRA, and the spectral characteristics SPB include a peak value PRB at the red peak wavelength $\lambda r$ of approximately 631 nm. In this case, the peak value PRB is less than the peak value PRA. Since the light-emitting diodes LD with the same specification are used, the spectral characteristics SPA and SPB have the same blue peak wavelength $\lambda b$; however, the peak values are not necessarily the same. In the example shown in the figure, the spectral characteristics SPA and SPB have the substantially same peak value at the blue peak wavelength $\lambda b$.

If the spectral characteristics SPA are the reference spectral characteristics shown in FIG. 5, the spectral characteristics SPB correspond to the spectral characteristics corresponding to the line L11 or L12. If the spectral characteristics SPB are the spectral characteristics corresponding to the line L11, the peak value PRB of the red peak wavelength $\lambda r$ is 90% of the peak value PRA. Further, if the spectral characteristics SPB are the spectral characteristics corresponding to the line L12, the peak value PRB of the red peak wavelength $\lambda r$ is 80% of the peak value PRA. Incidentally, the spectral characteristics SPA may be the spectral characteristics corresponding to the line L11, and the spectral characteristics SPB may be the spectral characteristics corresponding to the line L12.

In short, the spectral characteristics corresponding to the line L11 or L12 include a peak value equivalent to a peak value of the reference spectral characteristics at the green peak wavelength $\lambda g$, while including a peak value less than that of the reference spectral characteristics at the red peak wavelength $\lambda r$. Further, the spectral characteristics corresponding to the line L12 include a peak value equivalent to a peak value of the spectral characteristics corresponding to the line L11 at the green peak wavelength $\lambda g$, while including a peak value less than that of the spectral characteristics corresponding to the line L11 at the red peak wavelength $\lambda r$.

In the example shown in FIG. 8, the peak value at the red peak wavelength $\lambda r$ of approximately 631 nm is normalized to be 1 regarding two types of spectral characteristics of the light-emitting diodes LD, that is, spectral characteristics SPC and SPD. The spectral characteristics SPC include a peak value PGC, and the spectral characteristics SPD include a peak value PGD at the green peak wavelength $\lambda g$ of approximately 538 nm. In this case, the peak value PGD is less than the peak value PGC. Since the light-emitting diodes LD with the same specification are used, the spectral characteristics SPC and SPD have the same blue peak wavelength $\lambda b$; however, the peak values are not necessarily the same.

If the spectral characteristics SPC are the reference spectral characteristics described above, the spectral characteristics SPD correspond to the spectral characteristics corresponding to the line L21 or L22. If the spectral characteristics SPD are the spectral characteristics corresponding to the line L21, the peak value PGD is 90% of the peak value PGC. Further, if the spectral characteristics SPD are the spectral characteristics corresponding to the line L22, the peak value PGD is 80% of the peak value PGC. Incidentally, the spectral characteristics SPC may be the spectral characteristics corresponding to the line L21, and the spectral characteristics SPD may be the spectral characteristics corresponding to the line L22.

In short, the spectral characteristics corresponding to the line L21 or L22 include a peak value equivalent to a peak value of the reference spectral characteristics at the red peak wavelength λr, while including a peak value less than that of the reference spectral characteristics at the green peak wavelength λg. Further, the spectral characteristics corresponding to the line L22 include a peak value equivalent to a peak value of the spectral characteristics corresponding to the line L21 at the red peak wavelength λr, while including a peak value less than that of the spectral characteristics corresponding to the line L21 at the green peak wavelength λg.

Figure 9:
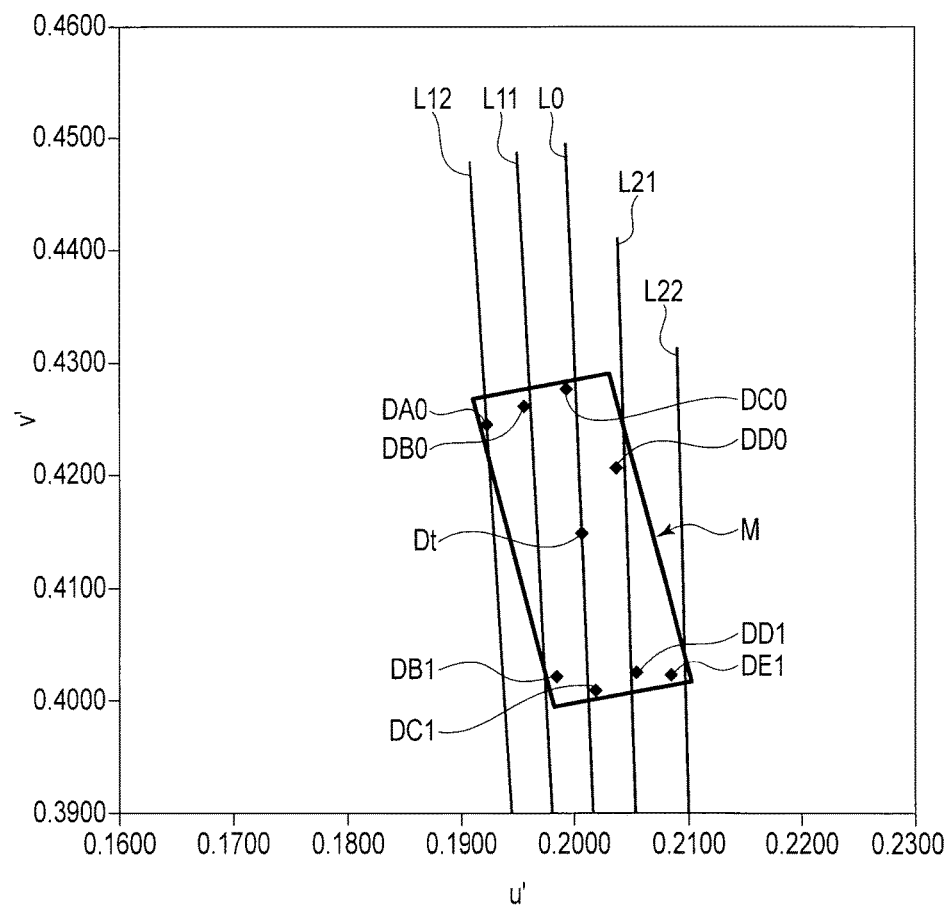
FIG. 9 is a u'v' color chromaticity diagram showing a relationship between an acceptable range of peak values of red and green peak wavelengths and the margin M regarding the light (white light) radiated from the light-emitting diodes LD with the same specification as that shown in FIG. 4.

FIG. 9 is a u'v' color chromaticity diagram showing a relationship between an acceptable range of peak values of the red and green peak wavelengths and the margin M regarding the light (white light) radiated from the light-emitting diodes LD with the same specification as that shown in FIG. 4.

The u'v' color chromaticity diagram is obtained by changing color chromaticity coordinates of the xy color chromaticity diagram on the basis of known equations. That is, the color chromaticity coordinates (u', v') are given from tristimulus values X, Y and Z of the XYZ color system, or color chromaticity coordinates (x, y) by $$u'=4X/(X+15Y+3Z)=4x/(-2x+12y+3)$$

$$v'=9Y/(X+15Y+3Z)=9y/(-2x+12y+3).$$

The margin M is shown in a quadrangle shape as well as the xy color chromaticity diagram shown in FIG. 6. Any of the lines L0, L11, L12, L21 and L22 shown in the figure crosses the margin M. Any of eight dots DA0, DB0, DB1, DC0, DC1, DD0, DD1 and DE1 shown in the figure is located inside the margin M.

Next, optimal mixing of the light-emitting diodes LD according to the present embodiment will be considered.

Although in one area light source apparatus LS, a plurality of types of light-emitting diode categorized by a color chromaticity rank are combined, two light-emitting diodes to be combined by mixing, that is, the light-emitting diodes LD1 and LD2 are hereinafter considered and described.

That is, each of the light-emitting diodes LD1 and LD2 according to the present embodiment is a light-emitting diode selected on the basis of a color chromaticity rank specified on a color chromaticity diagram using spectral intensity at each of wavelengths by the blue LED chip 12, the red phosphor 13R, and the green phosphor 13G as an index. The color chromaticity diagram described herein may be either an xy color chromaticity diagram, or a u'v' color chromaticity diagram. Alternatively, it may be another color chromaticity diagram.

Color chromaticity ranks are categorized by various methods. Here, the color chromaticity ranks are first categorized in accordance with each color chromaticity along five lines L0, L11, L12, L21 and L22 crossing the margin M shown in FIG. 6, and then categorized into a color chromaticity rank with a color chromaticity of a coordinate value greater than the y-coordinates of the target color chromaticity coordinates shown in the dot Dt, and that with a color chromaticity of coordinate value less than the y-coordinates of the target color chromaticity coordinates inside the margin M. For example, the light-emitting diodes LD with a specification included in the margin M are categorized into eight color chromaticity ranks by the above method. For example, eight color chromaticity ranks corresponds to eight areas A1 to A8 partitioned by the broken lines inside the margin M shown in FIG. 6. Incidentally, each broken line is located in the middle of adjacent lines of the five lines L0, L11, L12, L21 and L22. The dot DA0 shown in FIG. 6 corresponds to the color chromaticity of the typical light-emitting diode LD in the color chromaticity rank shown in the area A1. Similarly, the dot DB0 corresponds to the color chromaticity of the typical light-emitting diode LD in the color chromaticity rank shown in the area A2, DC0 corresponds to the color chromaticity of the typical light-emitting diode LD in the color chromaticity rank shown in the area A3, DD0 corresponds to the color chromaticity of the typical light-emitting diode LD in the color chromaticity rank shown in the area A4, DB1 corresponds to the color chromaticity of the typical light-emitting diode LD in the color chromaticity rank shown in the area A5, DC1 corresponds to the color chromaticity of the typical light-emitting diode LD in the color chromaticity rank shown in the area A6, DD1 corresponds to the color chromaticity of the typical light-emitting diode LD in the color chromaticity rank shown in the area A7, and DE1 corresponds to the color chromaticity of the typical light-emitting diode LD in the color chromaticity rank shown in the area A8.

The inventors selected two light-emitting diodes LD1 and LD2 from the light-emitting diodes LD categorized into the eight color chromaticity ranks to manufacture the area light source apparatus LS, and subjectively evaluated the appearance when the light-emitting diodes LD1 and LD2 are lit and observed.

FIG. 10 shows combinations of the selected light-emitting diodes LD1 and LD2 and evaluation results of the appearance.

In the figure, "X" corresponds to the case where individual colors of light radiated from the light-emitting diodes LD1 and LD2 were visually identified near the side surface LGC of the light guide LG. In the figure, "○" and "⊚" correspond to the case where individual light radiated from the light-emitting diodes LD1 and LD2 was fully mixed near the side surface LGC of the light guide LG, and individual colors were not visually identified. Further, in the figure, "⊚" corresponds to the case where a color chromaticity of white light was visually identified to be equivalent to a target color chromaticity when light radiated from the light-emitting diodes LD1 and LD2 was mixed.

In the case where the color chromaticity of the light-emitting diode LD1 was DA0, appearance was good if the color chromaticity of the light-emitting diode LD2 was DB0 or DB1. In particular, if the color chromaticity of the light-emitting diode LD2 was DB1, a color chromaticity closer to the target color chromaticity coordinates was obtained. On the other hand, if the color chromaticity of the light-emitting diode LD2 was DC0, DD0, DC1, DD1 and DE1, appearance was bad.

In the case where the color chromaticity of the light-emitting diode LD1 was DB0, appearance was good if the color chromaticity of the light-emitting diode LD2 was DB1, DC1 and DC0. In particular, if the color chromaticity of the light-emitting diode LD2 was DB1 and DC1, a color chromaticity closer to the target color chromaticity coordinates was obtained. On the other hand, if the color chromaticity of the light-emitting diode LD2 was DD0, DD1 and DE1, appearance was bad.

In the case where the color chromaticity of the light-emitting diode LD1 was DC0, appearance was good if the color chromaticity of the light-emitting diode LD2 was DB1, DC1, DD1 and DD0. In particular, if the color chromaticity of the light-emitting diode LD2 was DB1, DC1 and DD1, a color chromaticity closer to the target color chromaticity coordinates was obtained. On the other hand, if the color chromaticity of the light-emitting diode LD2 was DE1, appearance was bad.

In the case where the color chromaticity of the light-emitting diode LD1 was DD0, appearance was good and a color chromaticity closer to the target color chromaticity coordinates was obtained if the color chromaticity of the light-emitting diode LD2 was DC1, DD1 and DE1. On the other hand, if the color chromaticity of the light-emitting diode LD2 was DB1, appearance was bad.

Next, the inventors, selected two light-emitting diodes LD1 and LD2 from the light-emitting diodes LD categorized into the eight color chromaticity ranks to manufacture the area light source apparatus LS, lit the light-emitting diodes LD1 and LD2, and measured color chromaticity distribution on a surface using a measuring instrument. A measurement position was on the first principal surface LGA which was 3 to 4 mm away from the side surface LGC of the light guide LG. In this regard, 2D Color Analyzer, CA-2500 (made by Konica Minolta) was used as a measuring instrument.

FIG. 11A shows measurement results of color chromaticity distribution in a typical area light source apparatus LS. FIG. 11B illustrates a relationship between the light-emitting diodes LD1 and LD2 and measurement positions. Incidentally, the color chromaticity described herein is measured as a coordinate value on the u'v' color chromaticity diagram.

In FIG. 11A, (a) indicates a measurement result of color chromaticity distribution of the area light source apparatus LS manufactured by selecting the light-emitting diodes LD1 and LD2 determined to be bad in appearance by the subjective evaluation, and (b) indicates a measurement result of color chromaticity distribution of the area light source apparatus LS manufactured by selecting the light-emitting diodes LD1 and LD2 determined to be good in appearance by the subjective evaluation. Further, (a1) and (b1) in the figure indicate distribution of u'-coordinate values of measured color chromaticities, and (a2) and (b2) in the figure indicate distribution of v'-coordinate values of measured color chromaticities. Incidentally, the horizontal axis corresponds to a measurement position in (a1), (b1), (a2) and (b2). As shown in FIG. 11B, the light source unit LU in the area light source apparatus to be measured comprises four light-emitting diodes LD1 and four light-emitting diodes LD2, and is constituted such that the light-emitting diodes LD1 and the light-emitting diodes LD2 are alternately arranged along a single direction at equal pitches. The light-emitting diodes LD1 and the light-emitting diodes LD2 are different from each other in color chromaticity rank. Thus, a u'-coordinate value and a v'-coordinate value do not necessarily conform to each other at a measurement position near the light-emitting diodes LD1 and LD2. In the example shown in the figure, a difference is found between a v'-coordinate value at a measurement position near the light-emitting diode LD1 and that at a measurement position near the light-emitting diode LD2.

In the u'v' color chromaticity diagram, a tendency of green becomes stronger as a value shifts from white color chromaticity coordinates to the negative side of the horizontal axis u', and a tendency of red becomes stronger as a value shifts from white color chromaticity coordinates to the positive side of the horizontal axis u'. The smaller the amount of change of the u'-coordinate value is, the more the white color chromaticity is maintained (or the smaller the change of color is). Thus, the difference in color is hardly visually identified, and appearance is determined to be good. Conversely, the larger the amount of change of the u'-coordinate value is, the more the difference in color between red and green is easily visually identified, and appearance is determined to be bad. According to the measurement result of (a1), the amount of change of the u'-coordinate value is approximately 0.008. On the other hand, according to the measurement result of (b1), the amount of change of the u'-coordinate value is approximately 0.003, and it is confirmed that the value hardly changes from the white color chromaticity coordinates.

On the other hand, a change in color on the positive or negative side of the vertical axis v' from the white color chromaticity coordinates is hard to visually identify. It is thus confirmed that the change has few effect on appearance, although the amount of change of the v'-coordinate value is approximately 0.01 according to the measurement results of both (a2) and (b2).

Based on the above evaluation results, suitable mixing methods of the light-emitting diodes LD according to the present embodiment are described below.

One suitable mixing method is to select the light-emitting diodes LD1 and LD2 with color chromaticities located on the same line or near the line inside the margin M. In other words, the selected two light-emitting diodes LD1 and LD2 include the following spectral characteristics in such a mixing method.

That is, the light-emitting diode LD1 includes the first spectral characteristics SP1 including the first the peak value PB1 at the blue peak wavelength λb, the second peak value PG1 at the green peak wavelength λg, and the third peak value PR1 at the red peak wavelength λr. The light-emitting diode LD2 includes the second spectral characteristics SP2 including the fourth the peak value PB2 at the blue peak wavelength λb, the fifth peak value PG2 at the green peak wavelength λg, and the sixth peak value PR2 at the red peak wavelength λr. In this case, the second peak value PG1 and the fifth peak value PG2 are substantially equal to each other, and the third peak value PR1 and the sixth peak value PR2 are substantially equal to each other. It should be noted that "substantially equal" referred to herein includes not only the case the peak values are identical to each other, but also the case where a predetermined acceptable range is included.

For example, such a mixing method corresponds to the case where the color chromaticities of the light-emitting diodes LD1 and LD2 are DB0 and DB1, DC0 and DC1, or DD0 and DD1, respectively.

Another suitable mixing method is to select the light-emitting diodes LD1 and LD2 with color chromaticities located on an adjacent line or near the line inside the margin M. In other words, the selected two light-emitting diodes LD1 and LD2 include the following spectral characteristics in such a mixing method.

That is, if the first spectral characteristics SP1 and the second spectral characteristics SP2 are normalized such that the light-emitting diode LD1 includes the first spectral characteristics SP1, the light-emitting diode LD2 includes the second spectral characteristics SP2, and the second peak value PG1 and the fifth peak value PG2 are set 1, the third peak value PR1 is greater than or equal to 90% and less than or equal to 100% of the sixth peak value PR2. This corresponds to the acceptable range of the third peak value PR1 and the sixth peak value PR2 being substantially equal to each other as described above.

In this regard, the correspondence relationship with the spectral characteristics shown in FIG. 7 is considered. The first spectral characteristics SP1 after the normalization correspond to the spectral characteristics SPB shown in the figure, the second spectral characteristics SP2 after the normalization correspond to the spectral characteristics SPA shown in the figure, the third peak value PR1 corresponds to the peak value PRB shown in the figure, and the sixth peak value PR2 corresponding to the peak value PRA shown in the figure.

For example, such a mixing method corresponds to the case where the color chromaticities of the light-emitting diodes LD1 and LD2 are DC0 and DB0, or DC1 and DB1, respectively.

Alternatively, if the first spectral characteristics SP1 and the second spectral characteristics SP2 are normalized such that the light-emitting diode LD1 includes the first spectral characteristics SP1, the light-emitting diode LD2 includes the second spectral characteristics SP2, and the third peak value PR1 and the sixth peak value PR2 are set 1, the second peak value PG1 is greater than or equal to 90% and less than or equal to 100% of the fifth peak value PG2. This corresponds to the acceptable range of the second peak value PG1 and the fifth peak value PG2 being substantially equal to each other as described above.

In this regard, the correspondence relationship with the spectral characteristics shown in FIG. 8 is considered. The first spectral characteristics SP1 after the normalization correspond to the spectral characteristics SPD shown in the figure, the second spectral characteristics SP2 after the normalization correspond to the spectral characteristics SPC shown in the figure, the second peak value PG1 corresponds to the peak value PGD shown in the figure, and the fifth peak value PG2 corresponds to the peak value PGC shown in the figure.

For example, such a mixing method corresponds to the case where the color chromaticities of the light-emitting diodes LD1 and LD2 are DC0 and DD0, or DC1 and DD1, respectively.

A more suitable mixing method of the above mixing methods is to select the light-emitting diodes LD1 and LD2 with color chromaticities facing each other across the target color chromaticity coordinates Dt inside the margin M. In other words, the two light-emitting diodes LD1 and LD2 are selected in the following manner in such a mixing method.

That is, the two light-emitting diodes LD1 and LD2 are selected such that the target color chromaticity coordinates Dt are located between a first color chromaticity of white light radiated from the light-emitting diode LD1, and a second color chromaticity of white light radiated from the light-emitting diode LD2.

For example, such a mixing method corresponds to the case where the color chromaticities of the light-emitting diodes LD1 and LD2 are DB0 and DB1, DC0 and DC1, or DD0 and DD1, respectively.

In this mixing method, the blue peak wavelength λb at which the first the peak value PB1 is obtained in the first spectral characteristics SP1 of the light-emitting diode LD1 is the same as the blue peak wavelength λb at which the fourth peak value PB2 is obtained in the second spectral characteristics SP2 of the light-emitting diode LD2 (that is, light-emitting diodes with the same specification are applied). However, the above mixing methods are not limited to the examples described above. They can be applied to the light-emitting diodes LD1 and LD2 having different blue peak wavelengths at a peak value.

Next, embodiments of the suitable mixing method of the light-emitting diodes LD according to the present embodiment will be described.

Embodiment 1

FIG. 12 is an xy color chromaticity diagram showing an example in which 14 color chromaticity ranks are set in a margin M.

In this regard, the margin M is divided by lines L0, L11 and L21 in the horizontal axis direction, and is divided by 0.005 at a y-coordinate value in the vertical axis direction. Then, seven color chromaticity ranks indicated by j1, k1, m1, n1, p1, r1 and s1 are set between the lines L0 and L11, and seven color chromaticity ranks indicated by j2, k2, m2, n2, p2, r2 and s2 are set between the lines L0 and L21.

Good appearance can be provided by combining light-emitting diodes included in color chromaticity ranks of the same row regarding the light-emitting diodes LD categorized into each of the color chromaticity ranks. For example, any combination is possible for the color chromaticity rank of each of j1, k1, m1, n1, p1, r1 and s1. Similarly, any combination is possible for the color chromaticity rank of each of j2, k2, m2, n2, p2, r2 and s2. Naturally, the combination of light-emitting diodes included in the same color chromaticity rank is also possible. In particular, regarding light-emitting diodes categorized into each of color chromaticity ranks of m1, n1, p1, m2, n2 and p2, light-emitting diodes included in the same color chromaticity rank may be combined without mixing.

On the other hand, a combination of light-emitting diodes included in color chromaticity ranks of different rows is not preferable because appearance is deteriorated.

The area light source apparatus LS manufactured by such mixing allows color chromaticities to be equalized on its surface, as well as near the light source unit LU. Further, the liquid crystal display device LCD in which such an area light source apparatus LS is applied allows good display quality to be achieved.

Further, such area setting by the color chromaticity ranks based on the lines L0 to L21 on the color chromaticity diagram can make it easy to determine which combination of light-emitting diodes produces a good light source (or which combination of light-emitting diodes does not produce a good light source) without checking the relationships between the lines one by one, for example, selecting a line which is to be an index, or checking a spacing degree from the line.

Further, it is preferable to combine light-emitting diodes included in color chromaticity ranks facing each other across the target color chromaticity coordinates indicated by the dot Dt of the color chromaticity ranks of the same row. For example, the color chromaticity in the color chromaticity rank of any of m1, n1 and p1 is obtained after mixing by combining the light-emitting diode included in the color chromaticity rank of any of j1, k1 and m1 and the light-emitting diode included in the color chromaticity rank of any of p1, r1 and s1. Similarly, the color chromaticity in the color chromaticity rank of any of m2, n2 and p2 is obtained after mixing by combining the light-emitting diode included in the color chromaticity rank of any of j2, k2 and m2 and the light-emitting diode included in the color chromaticity rank of any of p2, r2 and s2. The area light source apparatus LS manufactured by such mixing allows, especially, the color chromaticity closer to the target color chromaticity within the color chromaticity range further smaller than the margin M to be obtained.

In the example shown in the figure, the color chromaticity in the color chromaticity range specified by the coordinates D31-D34 shown in the figure can be obtained by the mixing. For example, the coordinates D31 are (x, y)=(0.267, 0.245), the coordinates D32 are (x, y)=(0.284, 0.260), the coordinates D33 are (x, y)=(0.274, 0.260), and the coordinates D34 are (x, y)=(0.276, 0.245). In such a color chromaticity range, Δx, which is a difference of an x-coordinate value, and Δy, which is a difference of a y-coordinate value, are (Δx, Δy)=(0.017, 0.015). That is, such mixing can further reduce individual differences in color chromaticity of each of manufactured area light source apparatuses LS.

Embodiment 2

FIG. 13 is an xy color chromaticity diagram showing an example in which 39 color chromaticity ranks are set in the margin M.

Embodiment 2 is different from Embodiment 1 in that the margin M is divided by the lines L0, L11 and L21 in the horizontal axis direction, and the space between adjacent lines is further divided into halves. Incidentally, the margin M is divided by 0.005 at a y-coordinate value in the vertical axis direction as with Embodiment 1.

Good appearance can be provided by combining light-emitting diodes included in color chromaticity ranks of the same row regarding light-emitting diodes LD categorized into each of the color chromaticity ranks. Further, since a case where light-emitting diodes included in color chromaticity ranks of adjacent rows are combined with each other corresponds to the case where light-emitting diodes included in the color chromaticity ranks of the same row are combined with each other in Embodiment 1, good appearance can be provided also in such a combination.

On the other hand, a combination of light-emitting diodes included in color chromaticity ranks of rows one row or more away from each other deteriorates the appearance, which is not preferable.

The area light source apparatus LS manufactured by such mixing, and the liquid crystal display device LCD in which such an area light source apparatus LS is applied can bring about an advantage similar to that described in Embodiment 1.

Further, it is preferable to combine light-emitting diodes included in color chromaticity ranks facing each other across the target color chromaticity coordinates indicated by the dot Dt of the color chromaticity ranks of the same row or adjacent rows. The area light source apparatus LS manufactured by such mixing can bring about an advantage similar to that described in Embodiment 1.

In the example shown in the figure, the color chromaticity in the color chromaticity range specified by the coordinates D41 to D44 shown in the figure can be obtained by the mixing. For example, the coordinates D41 are (x, y)=(0.266, 0.245), the coordinates D42 are (x, y)=(0.284, 0.260), the coordinates D43 are (x, y)=(0.273, 0.260), and the coordinates D44 are (x, y)=(0.277, 0.245). In such a color chromaticity range, Δx and Δy are (Δx, Δy)=(0.018, 0.015).

Next, an example of a layout of the light-emitting diodes LD of the light source unit LU which can be applied to the present embodiment will be described.

FIG. 14 shows an example of a layout of the light-emitting diodes LD in the light source unit LU shown in FIG. 1.

In the example indicated by (a) in the figure, the light source unit LU comprises two types of light-emitting diode selected as described above, that is, the light-emitting diodes LD1 and LD2 on the flexible circuit board LFPC. The light-emitting diodes LD1 and LD2 are alternately arranged.

In the example indicated by (b) in the figure, the light source unit LU comprises a light source set LST including three or more types of light-emitting diode, that is, the light-emitting diodes LD1, LD2, LD3, . . . , on the flexible circuit board LFPC. The light source set LST is repeatedly arranged. The light-emitting diodes LD1, LD2, LD3, . . . , included in the light source set LST are selected by the above suitable method.

Next, another embodiment will be described. That is, the inventors selected two light-emitting diodes LD1 and LD2 with different color chromaticities to manufacture 24 types of area light source apparatus LS, and subjectively evaluated the appearance when the light-emitting diodes LD1 and LD2 are lit and observed.

Figure 15:
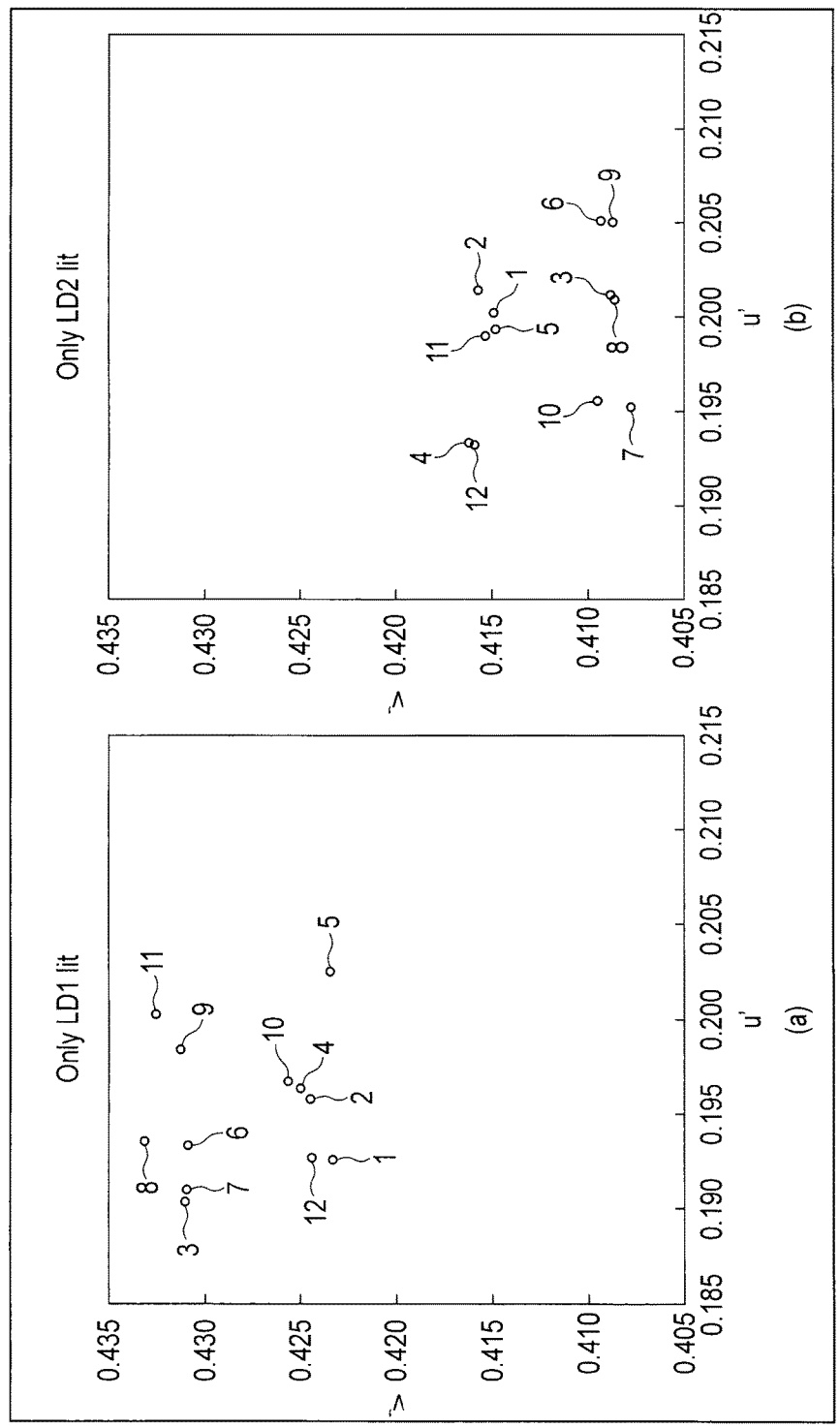
FIG. 15 shows color chromaticities of the light-emitting diodes LD1 and LD2 applied to the area light source apparatuses LS corresponding to sample numbers 1-12.
Figure 16:
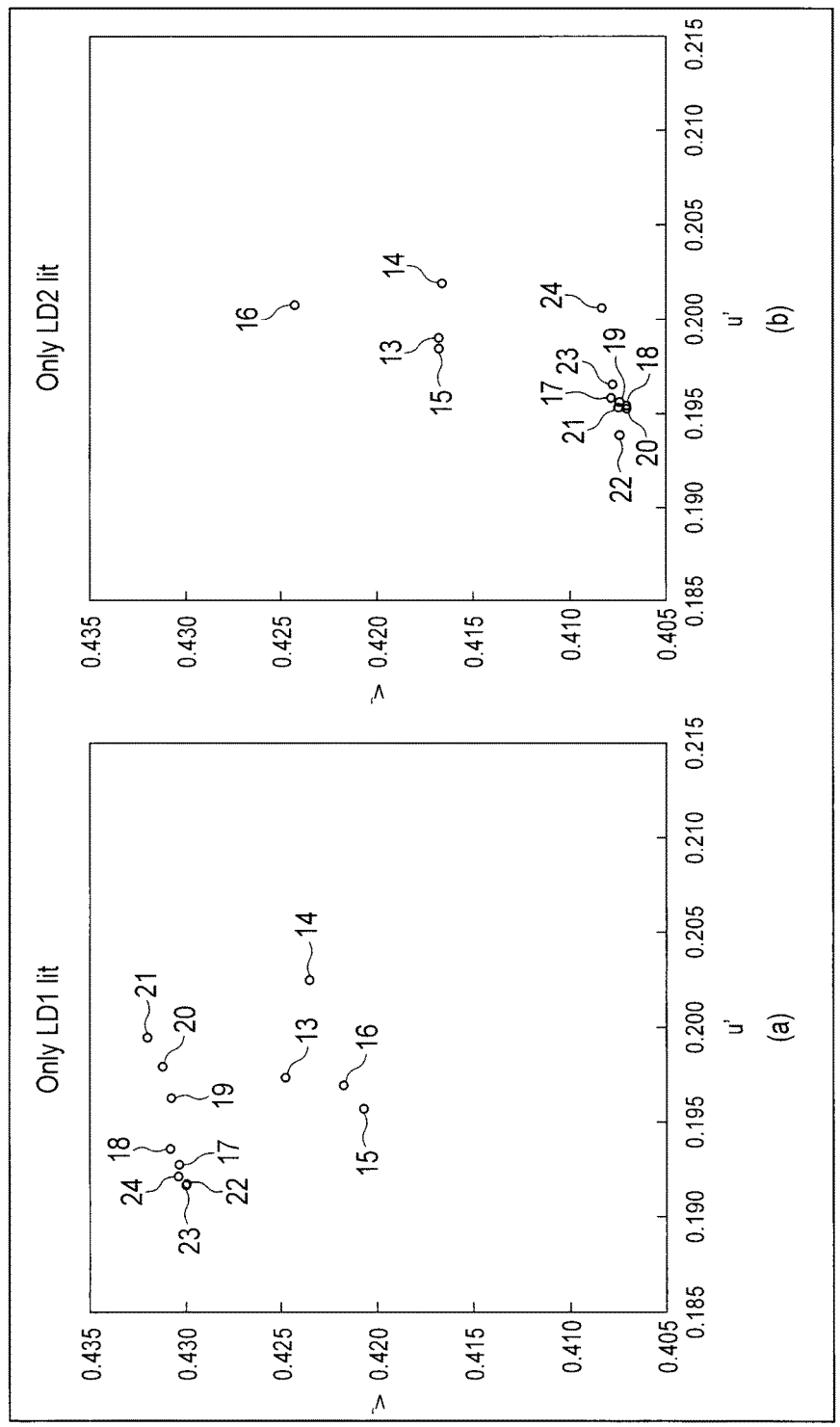
FIG. 16 shows color chromaticities of the light-emitting diodes LD1 and LD2 applied to the area light source apparatuses LS corresponding to sample numbers 13-24.

FIG. 15 shows color chromaticities of the light-emitting diodes LD1 and LD2 applied to the area light source apparatuses LS corresponding to sample numbers 1-12. FIG. 16 shows color chromaticities of the light-emitting diodes LD1 and LD2 applied to the area light source apparatuses LS corresponding to sample numbers 13-24. In FIGS. 15 and 16, (a) indicates a color chromaticity when only the light-emitting diode LD1 is lit in the area light source apparatus LS, and (b) indicates a central color chromaticity when only the light-emitting diode LD2 is lit in the area light source apparatus LS. The numbers shown in the figure indicate sample numbers. In this regard, the color chromaticities were measured as a coordinate value on a u'v' color chromaticity diagram. Further, a spectroradiometer, CS2000 (made by Konica Minolta) was used as a measuring instrument.

In any of the 24 types of area light source apparatus LS, the difference between the blue peak wavelength of the light-emitting diode LD1 and that of the light-emitting diode LD2 is within 3 nm. For example, a light-emitting diode whose blue peak wavelength is within a range from 444.8 nm to 447.7 nm is applied to the 24 types of area light source apparatus LS, and selected for each of the light-emitting diodes LD1 and LD2.

FIG. 17 shows sample numbers of the area light source apparatuses LS and evaluation results of appearance. In the figure, "X" corresponds to the case where individual colors of light radiated from the light-emitting diodes LD1 and LD2 are visually identified as non-uniformity in color chromaticity near the side surface LGC of the light guide LG. In the figure, "Δ" corresponds to the case where light radiated from the light-emitting diodes LD1 and LD2 is mixed near the side surface LGC of the light guide LG, and non-uniformity in color chromaticity is accepted. In the figure, "○" corresponds to the case where non-uniformity in color chromaticity is hardly seen near the side surface LGC of the light guide LG. In the figure, "⊙" corresponds to the case where non-uniformity in color chromaticity is not seen at all near the side surface LGC of the light guide LG. As shown in the figure, it is confirmed that samples other than sample numbers 3, 6 and 24 are in the acceptable range in which the non-uniformity in color chromaticity does not stand out.

FIG. 18 shows a correlation between a color chromaticity difference of the light-emitting diodes LD1 and LD2 in the area light source apparatus LS corresponding to each sample and appearance. In this regard, the difference in u'-coordinate value of the color chromaticity of each of the light-emitting diodes LD1 and LD2, that is, Δu' is considered as a color chromaticity difference, where Δu' is an absolute value. As shown in the figure, it is confirmed that the area light source apparatuses whose Δu' is less than or equal to 0.0078 are in the acceptable range in which the non-uniformity in color chromaticity does not stand out.

That is, as one suitable mixing method, two light-emitting diodes LD1 and LD2 included in the area light source apparatus LS are selected such that the absolute value of the difference in u'-coordinate value is less than or equal to 0.0078, when each of the first color chromaticity of white light radiated from the light-emitting diode LD1 and the second color chromaticity of white light radiated from the light-emitting diode LD2 is represented as a coordinate value on the u'v' color chromaticity diagram.

FIG. 19 shows a correlation between a difference of peak values at peak wavelengths of the light-emitting diodes LD1 and LD2 in the area light source apparatus LS corresponding to each sample and appearance. In this regard, the difference in peak value at the red peak wavelength λr in the spectral characteristics of each of the light-emitting diodes LD1 and LD2 is considered as a difference in peak value. That is, as shown in FIG. 7, if the light-emitting diode LD1 includes the spectral characteristics SPA, the light-emitting diode LD2 includes the spectral characteristics SPB, and the spectral characteristics SPA and SPB include the peak values PRA and PRB at the red peak wavelength λr, respectively, a difference ΔP of the peak values corresponds to (PRA-PRB) %. As shown in the figure, it is confirmed that the area light source apparatuses whose difference ΔP of the peak values is less than or equal to 20.2% are in the acceptable range in which the non-uniformity in color chromaticity does not stand out.

That is, as one suitable mixing method, when the spectral characteristics of the light-emitting diodes LD1 and LD2 are normalized such that each of the peak values at the green peak wavelength λg is 1, the peak value of the light-emitting diode LD1 at the red peak wavelength λr is greater than or equal to 79.8% and less than or equal to 100% of that of the light-emitting diode LD2, on the assumption that the difference between the blue peak wavelength of the light-emitting diode LD1 and that of the light-emitting diode LD2 is within 3 nm.

Although the difference of the peak values at the red peak wavelength λr is considered as a difference of peak values in the example shown in the figure, a similar tendency is confirmed also when the difference of the peak values at the green peak wavelength λg is considered. That is, as another suitable mixing method, the peak value of the light-emitting diode LD1 at the green peak wavelength λg is greater than or equal to 79.8% and less than or equal to 100% of that of the light-emitting diode LD2, when the spectral characteristics of the light-emitting diodes LD1 and LD2 are normalized such that each of the peak values at the red peak wavelength λr is 1.

As described above, the present embodiment can provide an area light source apparatus which can equalize color chromaticities on its surface, and a liquid crystal display device with good display quality.

Incidentally, the area light source apparatus LS according to the present embodiment may be arranged on the front side of the liquid crystal display panel PNL, that is, on a side facing the second substrate SUB2. It may function as a front light.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An area light source apparatus comprising:
a first light source and a second light source which are aligned in a single direction;
a light guide including a side surface facing the first light source and the second light source, a first principal surface, and a second principal surface crossing the side surface;
a flexible circuit board on which the first light source and the second light are mounted;
a reflective sheet facing the second principal surface;
a diffusion sheet disposed on the first principal surface; and
a prism sheet disposed on the diffusion sheet,
wherein each of the first light source and the second light source is a three-wavelength light-emitting diode comprising a blue light-emitting diode chip, a red phosphor and a green phosphor,
the first light source includes first spectral characteristics including a first peak value at a blue peak wavelength, a second peak value at a green peak wavelength, and a third peak value at a red peak wavelength,
the second light source includes second spectral characteristics including a fourth peak value at a blue peak wavelength, a fifth peak value at a green peak wavelength, and a sixth peak value at a red peak wavelength,
the second peak value and the fifth peak value are substantially equal to each other, and the third peak value and the sixth peak value are substantially equal to each other,
the first peak value is different from the fourth peak value,
the diffusion sheet expends more closely toward the first light source and the second light source than the prism sheet,
each of the first light source and the second light source includes a light-emitting surface,
a space is formed between the light-emitting surface and the side surface,
the flexible circuit board overlaps the space, and
an end portion of the reflective sheet is located between the side surface and an end portion of the diffusion sheet.

2. The area light source apparatus of claim 1, wherein the third peak value is greater than or equal to 90% and less than or equal to 100% of the sixth peak value, when the first spectral characteristics and the second spectral characteristics are normalized such that the second peak value and the fifth peak value are 1.

3. The area light source apparatus of claim 1, wherein the second peak value is greater than or equal to 90% and less than or equal to 100% of the fifth peak value, when the first spectral characteristics and the second spectral characteristics are normalized such that the third peak value and the sixth peak value are 1.

4. The area light source apparatus of claim 1, wherein the first light source and the second light source are selected such that target color chromaticity coordinates are located between a first color chromaticity of white light radiated from the first light source and a second color chromaticity of white light radiated from the second light source.

5. The area light source apparatus of claim 1, wherein the blue peak wavelength of the first peak value is the same as the blue peak wavelength of the fourth peak value.

6. The area light source apparatus of claim 1, wherein a difference between the blue peak wavelength of the first peak value in the first light source and the blue peak wavelength of the fourth peak value in the second light source is within 3 nm, and
the third peak value is greater than or equal to 79.8% and less than or equal to 100% of the sixth peak value, when the first spectral characteristics and the second spectral characteristics are normalized such that the second peak value and the fifth peak value are 1.

7. The area light source apparatus of claim 1, wherein a difference between the blue peak wavelength of the first peak value in the first light source and the blue peak wavelength of the fourth peak value in the second light source is within 3 nm, and
the second peak value is greater than or equal to 79.8% and less than or equal to 100% of the fifth peak value, when the first spectral characteristics and the second spectral characteristics are normalized such that the third peak value and the sixth peak value are 1.

8. The area light source apparatus of claim 1, wherein the first light source and the second light source are selected such that an absolute value of a difference in u'-coordinate value is less than or equal to 0.0078, when each of a first color chromaticity of white light radiated from the first light source and a second color chromaticity of white light radiated from the second light source is represented as a coordinate value on a u'v' color chromaticity diagram.

9. The area light source apparatus of claim 1, wherein a seventh peak value which achieves a target color chromaticity is between the first peak value and the fourth peak value, and
the first peak value is greater than or equal to 0.9 and less than or equal to 0.95 and the fourth peak value is greater than or equal to 1.05 and less than or equal to 1.10, when the seventh peak value is 1.

10. The area light source apparatus of claim 1, wherein an amount of change in u'-coordinate value is less than or equal to 0.003 when a color chromaticity in which the first light source and the second light source are concurrently lit is represented as a coordinate value on a u'v' color chromaticity diagram.

11. A liquid crystal display device comprising:
a first light source and a second light source which are aligned in a single direction;
a light guide including a side surface facing the first light source and the second light source, a first principal surface, and a second principal surface crossing the side surface;
a flexible circuit board on which the first light source and the second light are mounted;
a reflective sheet facing the second principal surface;
a diffusion sheet disposed on the first principal surface; and
a prism sheet disposed on the diffusion sheet; and
a liquid crystal display panel located on a side facing the first principal surface,
wherein each of the first light source and the second light source is a three-wavelength light-emitting diode comprising a blue light-emitting diode chip, a red phosphor and a green phosphor,
the first light source includes first spectral characteristics including a first peak value at a blue peak wavelength, a second peak value at a green peak wavelength, and a third peak value at a red peak wavelength,
the second light source includes second spectral characteristics including a fourth peak value at a blue peak wavelength, a fifth peak value at a green peak wavelength, and a sixth peak value at a red peak wavelength,
the second peak value and the fifth peak value are substantially equal to each other, and the third peak value and the sixth peak value are substantially equal to each other,
the first peak value is different from the fourth peak value,
the diffusion sheet expends more closely toward the first light source and the second light source than the prism sheet,
each of the first light source and the second light source includes a light-emitting surface,
a space is formed between the light-emitting surface and the side surface,
the flexible circuit board overlaps the space, and
an end portion of the reflective sheet is located between the side surface and an end portion of the diffusion sheet.

12. The liquid crystal display device of claim 11, wherein the third peak value is greater than or equal to 90% and less than or equal to 100% of the sixth peak value, when the first spectral characteristics and the second spectral characteristics are normalized such that the second peak value and the fifth peak value are 1.

13. The liquid crystal display device of claim 11, wherein the second peak value is greater than or equal to 90% and less than or equal to 100% of the fifth peak value, when the first spectral characteristics and the second spectral characteristics are normalized such that the third peak value and the sixth peak value are 1.

14. The liquid crystal display device of claim 11, wherein the first light source and the second light source are selected such that target color chromaticity coordinates are located between a first color chromaticity of white light radiated from the first light source and a second color chromaticity of white light radiated from the second light source.

15. The liquid crystal display device of claim 11, wherein the blue peak wavelength of the first peak value is the same as the blue peak wavelength of the fourth peak value.

16. The liquid crystal display device of claim 11, wherein a difference between the blue peak wavelength of the first peak value in the first light source and the blue peak wavelength of the fourth peak value in the second light source is within 3 nm, and
the third peak value is greater than or equal to 79.8% and less than or equal to 100% of the sixth peak value, when the first spectral characteristics and the second spectral characteristics are normalized such that the second peak value and the fifth peak value are 1.

17. The liquid crystal display device of claim 11, wherein a difference between the blue peak wavelength of the first peak value in the first light source and the blue peak wavelength of the fourth peak value in the second light source is within 3 nm, and the second peak value is greater than or equal to 79.8% and less than or equal to 100% of the fifth peak value, when the first spectral characteristics and the second spectral characteristics are normalized such that the third peak value and the sixth peak value are 1.

18. The liquid crystal display device of claim 11, wherein the first light source and the second light source are selected such that an absolute value of a difference in u'-coordinate value is less than or equal to 0.0078, when each of a first color chromaticity of white light radiated from the first light source and a second color chromaticity of white light radiated from the second light source is represented as a coordinate value on a u'v' color chromaticity diagram.

19. The liquid crystal display device of claim 11, wherein a seventh peak value which achieves a target color chromaticity is between the first peak value and the fourth peak value, and
the first peak value is greater than or equal to 0.9 and less than or equal to 0.95 and the fourth peak value is greater than or equal to 1.05 and less than or equal to 1.10, when the seventh peak value is 1.

20. The liquid crystal display device of claim 11, wherein an amount of change in u'-coordinate value is less than or equal to 0.003 when a color chromaticity in which the first light source and the second light source are concurrently lit is represented as a coordinate value on a u'v' color chromaticity diagram.

* * * * *